United States Patent
Pouchak et al.

(10) Patent No.: US 7,819,334 B2
(45) Date of Patent: Oct. 26, 2010

(54) MULTI-STAGE BOILER STAGING AND MODULATION CONTROL METHODS AND CONTROLLERS

(75) Inventors: Michael A. Pouchak, Saint Anthony, MN (US); Paul Wacker, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 716 days.

(21) Appl. No.: 10/809,115

(22) Filed: Mar. 25, 2004

(65) Prior Publication Data

US 2005/0230490 A1    Oct. 20, 2005

(51) Int. Cl.
F24D 19/10 (2006.01)
F24D 3/02 (2006.01)
F22D 5/00 (2006.01)

(52) U.S. Cl. ............... 237/8 R; 237/2 A; 237/8 A; 122/448.1; 122/448.3; 700/276; 700/278

(58) Field of Classification Search .............. 237/8 A, 237/8 R, 2 Q, 2 A; 122/448.1, 448.3; 454/121, 454/143, 152; 165/41, 42; 700/276, 278
See application file for complete search history.

(56) References Cited

U.S. PATENT DOCUMENTS

| | | | | |
|---|---|---|---|---|
| 2,177,496 | A * | 10/1939 | Miller et al. | 165/224 |
| 2,744,688 | A * | 5/1956 | Ross | 236/46 R |
| 2,868,461 | A * | 1/1959 | Gaddis | 237/9 R |
| 2,915,298 | A * | 12/1959 | Hamlin et al. | 165/221 |
| 3,211,975 | A * | 10/1965 | Burley | 318/639 |
| 3,329,339 | A * | 7/1967 | Watson | 236/26 R |
| 3,387,589 | A * | 6/1968 | Chan et al. | 122/1 R |
| 3,391,316 | A * | 7/1968 | Ross | 318/561 |
| 3,997,109 | A | 12/1976 | Hays | |
| 4,210,823 | A * | 7/1980 | Kabat et al. | 307/117 |

(Continued)

FOREIGN PATENT DOCUMENTS

EP    0325356    7/1989

(Continued)

OTHER PUBLICATIONS

Lochinvar Corporation, "LonWorks System Integrator Guide for the Intelli-Fin Boiler Interface Controller", Version LOCH SIG-01, pp. 1-59, Jun. 2001.

(Continued)

*Primary Examiner*—Steven B McAllister
*Assistant Examiner*—Patrick F. O'Reilly, III
(74) *Attorney, Agent, or Firm*—Crompton Seager & Tufte LLC

(57) ABSTRACT

Methods and devices for controlling multi-stage boiler systems. In one illustrative embodiment, the number of stages to be used is determined in a staging control sequence in response to a heating load, and in some cases, the individual stages are modulated to meet a heating load. In some embodiments, the staging control sequence may include observation of both heating load and the rate of change of the heating load. In another illustrative embodiment, the staging control compares a measured temperature to a setpoint and monitors changes in the measured temperature to make staging decisions. Various control methods are also provided to help achieve improved stability and efficiency, as desired.

26 Claims, 18 Drawing Sheets

U.S. PATENT DOCUMENTS

| | | | | |
|---|---|---|---|---|
| 4,373,663 | A | * | 2/1983 | Hammer .................. 236/15 R |
| 4,479,605 | A | * | 10/1984 | Billotte et al. .............. 237/8 R |
| 4,513,910 | A | | 4/1985 | Bartels |
| 4,587,401 | A | * | 5/1986 | Ekman ...................... 392/495 |
| 4,598,668 | A | * | 7/1986 | Bader ..................... 122/448.3 |
| 4,638,767 | A | | 1/1987 | George |
| 4,716,858 | A | * | 1/1988 | Bartels .................... 122/448.1 |
| 4,725,001 | A | * | 2/1988 | Carney et al. ................. 236/11 |
| 4,787,554 | A | * | 11/1988 | Bartels et al. ............ 236/26 R |
| 4,823,770 | A | * | 4/1989 | Loeffler ..................... 122/15.1 |
| 4,860,696 | A | * | 8/1989 | Fujita ..................... 122/448.3 |
| 4,864,972 | A | * | 9/1989 | Batey et al. ............. 122/448.3 |
| 4,930,488 | A | | 6/1990 | Pearman et al. |
| 4,941,609 | A | * | 7/1990 | Bartels et al. ............. 236/78 D |
| 5,042,431 | A | * | 8/1991 | Shprecher et al. ........ 122/448.3 |
| 5,172,654 | A | * | 12/1992 | Christiansen ............ 122/448.3 |
| 5,281,049 | A | * | 1/1994 | Holt ............................ 454/69 |
| 5,338,249 | A | * | 8/1994 | Hildebrand et al. ......... 454/126 |
| 5,452,687 | A | | 9/1995 | Christiansen |
| 5,713,515 | A | | 2/1998 | Adams et al. |
| 5,921,527 | A | * | 7/1999 | Ikawa et al. ............ 251/129.03 |
| 5,924,332 | A | * | 7/1999 | Ozeki ........................ 74/502.4 |
| 6,062,485 | A | | 5/2000 | Stege et al. |
| 6,179,212 | B1 | * | 1/2001 | Banko ....................... 236/1 E |
| 6,401,669 | B1 | * | 6/2002 | Macgowan et al. ...... 122/448.1 |
| 6,409,090 | B1 | * | 6/2002 | Gilvar et al. ................ 237/2 A |
| 6,416,404 | B2 | * | 7/2002 | Ozeki ......................... 454/156 |
| 6,507,774 | B1 | * | 1/2003 | Reifman et al. ............ 700/274 |
| 6,536,678 | B2 | | 3/2003 | Pouchak |
| 6,540,148 | B1 | | 4/2003 | Salsbury et al. |
| 6,647,302 | B2 | * | 11/2003 | Pouchak ...................... 700/83 |
| 6,694,927 | B1 | | 2/2004 | Pouchak et al. |
| 6,702,008 | B1 | * | 3/2004 | Hibino et al. ............... 165/202 |
| 6,735,965 | B2 | * | 5/2004 | Moon et al. ................... 62/175 |
| 6,745,085 | B2 | * | 6/2004 | Pouchak ...................... 700/21 |
| 6,761,214 | B2 | * | 7/2004 | Kuribayashi et al. ........ 165/204 |
| 6,904,874 | B1 | * | 6/2005 | Pouchak et al. ........... 122/448.2 |
| 7,222,800 | B2 | * | 5/2007 | Wruck ......................... 236/51 |
| 7,249,573 | B2 | * | 7/2007 | Kemp et al. ................. 122/504 |
| 7,506,617 | B2 | * | 3/2009 | Paine ...................... 122/448.3 |
| 2002/0193890 | A1 | | 12/2002 | Pouchak |
| 2003/0197066 | A1 | * | 10/2003 | Hull et al. .................. 236/49.3 |
| 2004/0256473 | A1 | * | 12/2004 | Hull et al. .................. 236/49.3 |

FOREIGN PATENT DOCUMENTS

| | | |
|---|---|---|
| EP | 0614047 | 9/1994 |
| WO | WO0194847 | 12/2001 |

OTHER PUBLICATIONS

ASHRAE Systems and Equipment Handbook, "Boilers", Chapter 27, pp. 27.1-27.6, 1996.

Engineering Manual of Automatic Control, "Chiller, Boiler, and Distribution System Control Applications", pp. 332-335, prior to filing date of current application.

ASHRAE Applications Handbook, "Service Water Heating", pp. 48.21-48.22, 1999.

ES Engineered Systems, "Features Item: A New Look At Modular Boiler Systems," 10 pages, Mar. 2001.

Lochinvar, "Intelli-Fin Gas Fired Boilers," 6 pages, Apr. 2003.

Lochinvar, "Intelli-Fin Sequencing Options Mean New Levels of Building Efficiency," 2 pages, Nov. 2002.

Slant Fin Terra Therma, Typical Applications, 15 pages, Feb. 2002.

Triad Boiler Systems Inc., "Modular Steel Firetube Packaged Boiler Systems," 3 pages, Mar. 12, 2004.

* cited by examiner

| % Call | Derivative | Previous # of Boilers On | # of Boilers to Call Next |
|---|---|---|---|
| 26 | 4 | 1 | 2 |
| 26 | 3 | 1 | 1 |
| 28 | 3 | 1 | 2 |
| 28 | 2 | 1 | 1 |
| 29 | 2 | 1 | 2 |
| 29 | 1 | 1 | 1 |
| 30 | n.a. | 1 | 2 |
| 34 | -4 | 3 | 2 |
| 34 | -3 | 3 | 3 |
| 32 | -3 | 3 | 2 |
| 32 | -2 | 3 | 3 |
| 31 | -2 | 3 | 2 |
| 31 | -1 | 3 | 3 |
| 30 | n.a. | 3 | 2 |
| 36 | 4 | 2 | 3 |
| 36 | 3 | 2 | 2 |
| 22 | -3 | 2 | 1 |
| 22 | -2 | 2 | 2 |
| 20 | n.a. | 2 | 1 |
| 40 | n.a. | 2 | 3 |
| 50 | n.a. | n.a. | 3 |
| 13 | n.a. | n.a. | 1 |

*FIG. 10*

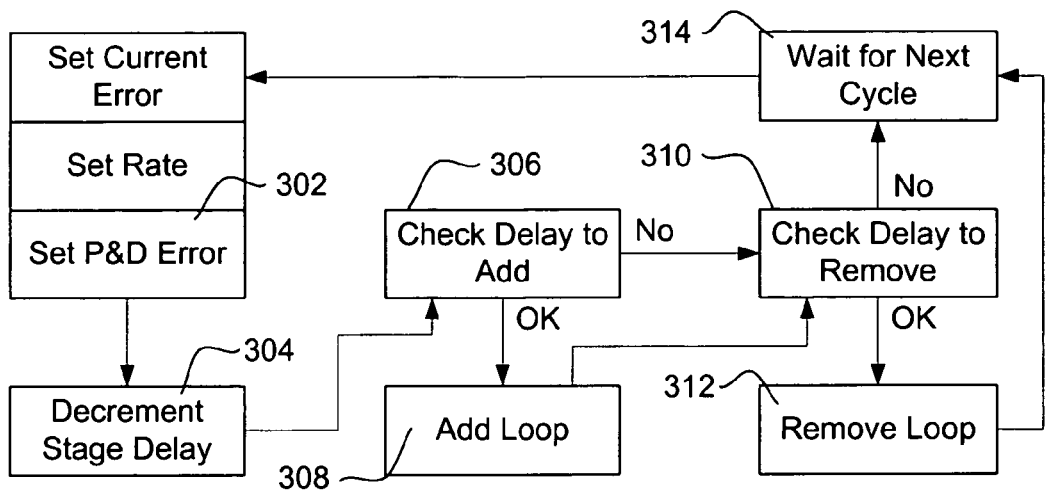

*Stager_Routine :// Rate = every*15 sec

*current_error = setpt − measured_value;*

*rate = measured_value − old_measured_value;*

*old_measured_value = measured_value;*

*error = current_error − k * rate; // user_adjustable_default_(k = 3)*

*error = upper* lim(*error*,+32);

*error = lower* lim(*error*,−32);

*stage_delay = stage_delay* − 1;

308

$$IF(stage\_delay \leq 0):THEN: \begin{bmatrix} stage\_delay = 0; \\ IF((error > throttling\_range)AND(rate < 1/128)): \\ THEN: \begin{bmatrix} Num\_Stages\_Rqst = Num\_Stages\_Rqst + 1; \\ stage\_delay = 8; \end{bmatrix} \end{bmatrix}$$

312

$$IF(stage\_delay \leq 4):THEN: \begin{bmatrix} IF((error < -throttling\_range)AND(rate > -1/128)): \\ THEN: \begin{bmatrix} Num\_Stages\_Rqst = Num\_Stages\_Rqst - 1; \\ stage\_delay = 8; \end{bmatrix} \end{bmatrix}$$

*FIG. 12*

*Efficiency_Optimized_Stager_Routine:*

Current_Error = Setpt − Measured_Value;

Rate = Measured_Value − Old_Measured_Value;

Old_Measured_Value = Measured_Value;

error = (Current_Error − k * Rate); // k = userchangeable_const.

error = Upper_lim(error,+32);

error = Lower_lim(error,−32);

Stage_Delay = Stage_Delay − 1;

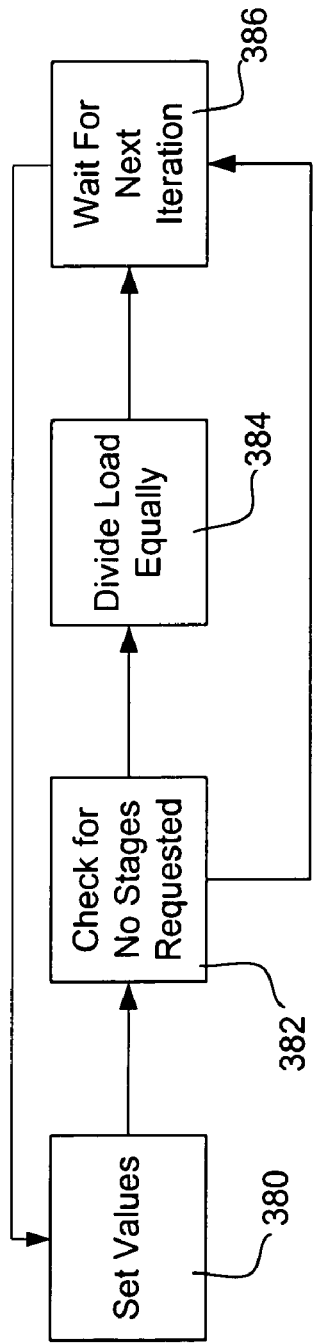

*Efficiency_Optimized_Stage_Control*

Heat_Command_Total = PID_Control(setpt,measured_value,throttling_range)
IF(Num_Stages_Rqst = 0)
THEN: $\left[ \begin{array}{l} FOR(i=0)to(i=Num\_Stages\_Config) \\ \quad [Heat\_Command[i]=0] \end{array} \right]$
ELSE, FOR(i = 0)to(i = Num_Stages_Config):
$\left[ Heat\_Command[i] = \dfrac{Heat\_Command\_Total * Num\_Stages\_Configured}{Num\_Stages\_Rqst} \right]$
IF(Heat_Command[i] >100;THEN:[Heat_Command[i] = 100];

*FIG. 17*

MULTI-STAGE BOILER STAGING AND MODULATION CONTROL METHODS AND CONTROLLERS

FIELD

The present invention is related to the field of heating and/or hot water boilers, and more particularly, to methods and devices for controlling multi-stage boiler systems.

BACKGROUND

Recent innovations in boiler technologies have led to the introduction of modular boiler systems making use of several small boilers for applications where, in the past, a single, larger boiler may have been used. Such modular systems are often adaptable for changing uses over time when, for example, an addition may necessitate greater boiler capacity than that originally needed in a building.

One of the challenges in such a system is the need to identify efficient operational modes given changing heat loads over time. In a given system, different times of the day may require different amounts of heat production. For example, given a relatively simple example of a three boiler system, during setback periods (e.g. night), only one of the boilers may be needed to satisfy the heat load of the building. During a warmup period (e.g. early morning) following a setback period, all three boilers may be needed, while during ordinary operation (e.g. late morning), only two boilers may be needed, and during light ordinary operation (e.g. mid-afternoon) a single boiler may be sufficient.

Control of such boiler systems can be further complicated by the relative efficiencies of certain boilers. For example, FIG. 1 is an illustrative graph of efficiency data for an example commercial boiler. It can be seen that efficiency may improve as return water temperature drops, while efficiency may drop as the percentage of total output capacity increases. It should be noted that a minimum firing rate is also needed for stability and safety purposes, often due to ventilation/exhaust needs. Meanwhile, difficulties can arise with return water temperatures at low firing rates, as explained by Pouchak, et al., in U.S. Pat. No. 6,694,927, which is incorporated herein by reference.

SUMMARY

An illustrative embodiment of the present invention may include a method for controlling a multi-stage boiler system. This may include controlling the staging, modulation and/or both. In one illustrative embodiment, the number of stages to be used is determined in a staging control sequence in response to a heating load, and in some cases, the individual stages are modulated to meet a heating load. In some embodiments, the staging control sequence may include observation of both heating load and the rate of change of the heating load. In another illustrative embodiment, the staging control compares a measured temperature to a setpoint and monitors changes in the measured temperature to make staging decisions. Various control methods are also provided to help achieve improved stability and efficiency, as desired.

BRIEF DESCRIPTION OF THE DRAWINGS

FIG. 10 is a chart illustrating various control responses in illustrative numerical format;

FIG. 12 shows a block diagram and pseudocode for an illustrative staging method;

FIG. 17 shows a block diagram and pseudocode for an illustrative efficiency optimized modulation method;

DETAILED DESCRIPTION

The following detailed description should be read with reference to the drawings. The drawings, which are not necessarily to scale, depict illustrative embodiments and are not intended to limit the scope of the invention.

For the purposes herein, both the terms boiler and stage are used. A stage represents a heating element having a heat exchanger for heating a circulating or working fluid. A boiler is a device for warming a circulating or working fluid that includes one or more stages. While the following description focuses primarily on hot water boilers, the methods illustrated herein are also suitable for boilers that operate where the circulating fluid can be another substance or may undergo a phase change or be a gas, such as steam boilers.

Figure 1:
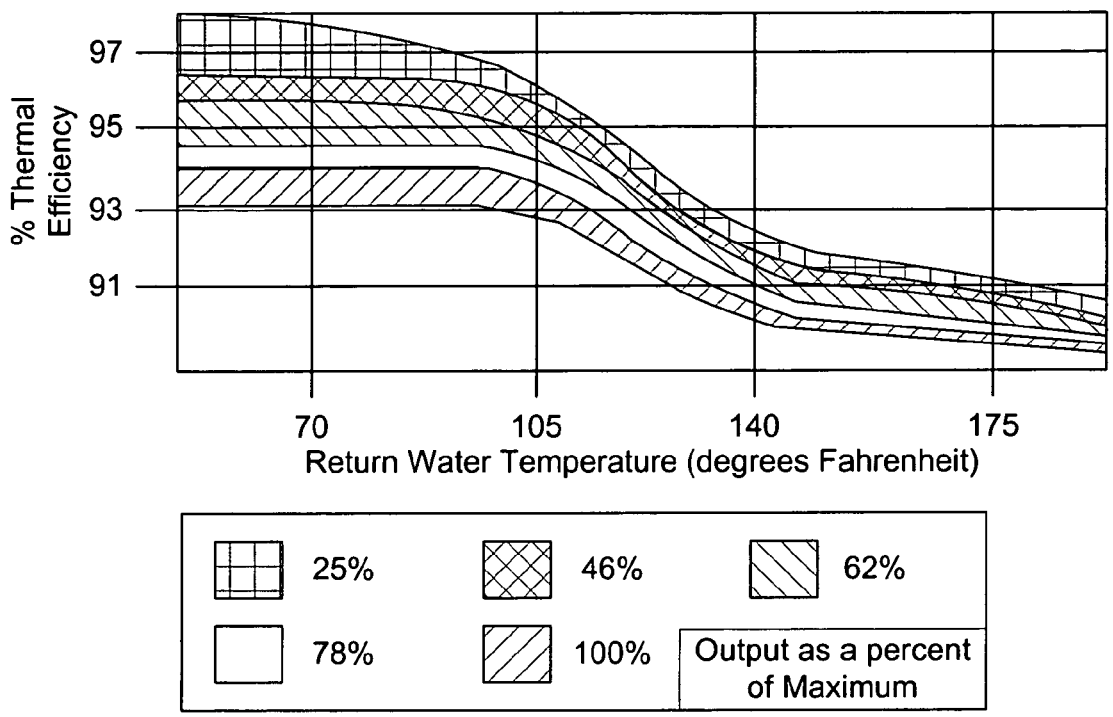
FIG. 1 is a graph of efficiency data for an example commercial hot water boiler.

For some of the following illustrative embodiments, methods of boiler control are provided wherein there are a number of selectable control modes. One of the selectable control modes in some embodiments is a "efficiency optimized mode" designed to operate system components in operational ranges associated with higher efficiency. For boilers operating with efficiency curves similar to those illustrated in FIG. 1, an efficiency optimized mode is designed to operate one or more boilers in a range corresponding to increased efficiency for the boiler(s). The following embodiments are described in terms and using numerical examples that may refer to the efficiency curves shown in FIG. 1. However, the present invention is not limited to use with these particular efficiency curves, and may be adapted for use with boilers having different characteristics. For example, while the curves shown in FIG. 1 illustrate a boiler that has its highest efficiency near its lowest output capacity, with a minimum output capacity of around 25% of maximum heat output, the present methods may be used for maximizing efficiency for other boiler systems having different high efficiency ranges and/or different minimum output capacities.

In an illustrative example of an optimization method, a number of boilers may be controlled by a single controller that performs staging of the boilers and also outputs a modulation signal to each boiler. The modulation signal may be, for example, a total heat command output. For the illustrative example, the staging may be performed such that, if at a given time a number of boilers X are operating, an additional boiler is activated when it is determined that the system is operating under relatively stable load conditions and the heating output is outside of a throttling range. In a further step of the illustrative example, a stage is deactivated when the X stages then operating are operating in a stable fashion above a throttling range. Yet another illustrative example may remove stages from the set of active stages when necessary to reduce heat output.

In another illustrative example of an optimization method (using the graph in FIG. 1), a number of boilers having a maximum efficiency at 25% of their maximum heat output are controlled. The example operates using a first on/first off lead lag method, but other methods are possible. At a given time, a number "X" of the boilers are operating. To determine whether another boiler should be added or if one of the "X" boilers is not needed, the overall heating load may be determined as a percentage of the total heating capacity. Then it is determined whether, if another boiler is added, all the boilers can operate near their maximum efficiency. If so, an additional boiler is added. It is also determined whether any of the boilers are operating at a firing rate that is below the firing rate for optimum efficiency and, if so, whether a boiler could be removed to improve efficiency of the overall system. The illustrative example may further include additional checks on the operation and stability of the system so that boilers are not added or removed in a manner that causes undesired transients around a setpoint.

For example, if a single boiler is operating, and the maximum efficiency for the boiler occurs when operating at 25% of its maximum heat output, then a second boiler may be added when the first boiler reaches a 50% output. Two boilers may remain running until it becomes possible to have only one boiler operating at maximum efficiency. For example, when two boilers are running at 25% and producing more heat than needed, the first boiler may be shut off so that the second boiler can resume operating at a level below 50%. In this example, the first boiler, rather than the second boiler, goes off because the system is operating in a first on/first off method. If there is a lower limit for boiler operation (for example, around 20% of maximum firing rate), then a boiler may shut off as soon as the minimum firing rate is reached, causing the other boiler(s) to provide the added load.

Figure 2:
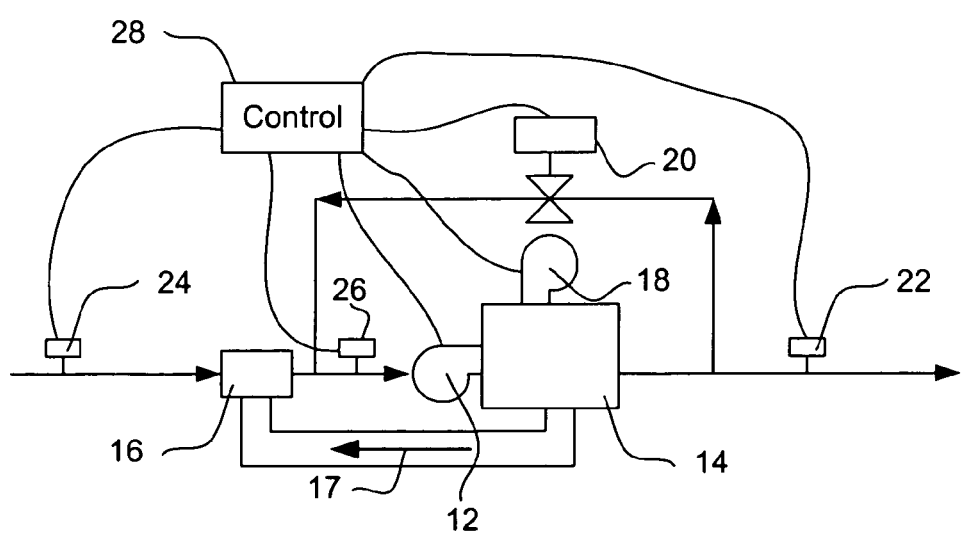
FIG. 2 is a schematic diagram of a high efficiency condensing boiler.

FIG. 2 is a schematic diagram of a high efficiency condensing boiler. The system includes a pump 12 for infusing water to a primary heat exchanger 14. Flue gasses 17 from the primary heat exchanger 14 are directed to a secondary heat exchanger 16 placed in the return water path for the system. Firing rate and (indirectly) flue gas flows are controlled using a combustion/purge blower 18. The firing rate may also be controlled using other devices and methods including, for example, air fuel mixers that can have varying ratios as well as combustion air controls. A bypass valve 20 is used to direct output water back to the return flow before it enters the primary heat exchanger 14 as needed. The mix of return water and output water directed back by the bypass valve is called bypass water. Several sensors 22, 24, 26 may be provided to relay signals to a controller 28. The controller 28 may control several system components including the pump 12, blower 18, and bypass valve 20, as well as the rest of the boiler (including, for example, gas control valves which are not shown), if desired.

For the purposes herein, the sensor that senses the fluid temperature prior to the secondary heat exchanger 16 may be referred to as the inlet sensor 24. The sensor that senses the fluid temperature between the secondary heat exchanger 16 and the primary heat exchanger 14 of the mixture of return and output water directed back through the bypass valve may be referred to as the bypass sensor 26. The sensor sensing temperature of fluid after the primary heat exchanger 14 may be referred to as the output sensor 22.

If the temperature sensed by the bypass temperature sensor 26 is too low, the bypass water temperature may be low enough to cause condensation in the primary heat exchanger 14. In some cases, this may cause damage to the primary heat exchanger. In response to the bypass temperature sensor 26, the bypass valve 20 may open to a greater degree to allow output water to feed back to the return flow and warm the temperature sensed at the bypass sensor 26. If the bypass valve 20 is already fully open, the firing rate of the boiler may also be adjusted to increase its heat output. Copending U.S. patent application Ser. No. 10/809,116, entitled FORWARD CALCULATION ENERGY AUGMENTATION METHOD, now U.S. Pat. No. 6,904,874; which is expressly incorporated herein by reference, illustrates various methods for overcoming low bypass temperatures and avoiding condensation in the primary heat exchanger 14.

The combustion/purge blower 18 may be a variable frequency drive unit that can provide a variable firing rate for the boiler. In the illustrative example, an air/gas valve and mixer modulates the fuel mix as well to modify heat output of the boiler. When the variable frequency drive of the blower 18 operates at an increased level, the blower 18 increases the heating output of the boiler by using a greater volume of air/fuel mixture, and forces a greater amount of flue gasses 17 to the secondary heat exchanger 16.

During operation, the secondary heat exchanger 16 typically warms inlet water before it enters the primary heat exchanger 14. As flue gasses 17 pass through the secondary heat exchanger 16, condensate can form inside the secondary heat exchanger 16, which in some cases, is designed and adapted to handle condensation without resulting in excessive corrosion and/or damage.

The cold water return issue points out that, while an efficiency optimized control method provides advantages in some circumstances, there may be times where other control methods may prove to be more suitable. Additional concerns include but are not limited to stability issues, short cycles, changing loads, and moving setpoints. For example, some industrial processes are such that switching boilers in and out is not tolerable due to temperature variations that can accompany such switching.

For another example, certain applications (such as sidewalk de-icing) can result in large drops in water temperature such that the inlet water temperature drops dramatically. Low inlet water temperatures can lead to low bypass temperatures which, in turn, can result in low bypass temperatures. Systems having bypass valves 20 can be adapted to compensate for some temperature drop (see U.S. Pat. No. 6,694,927 to Pouchak et al., which is incorporated herein by reference). However, in many cases, a 1% increase in firing rate can have a greater effect on bypass temperature than a 1% opening of a bypass valve. However, with an efficiency optimized method the increased firing rate, if spread across two boilers, can increase output to the point where it causes short cycling or repeated cycling of the entire system.

Taking the above into account, an example situation where a non-efficiency optimized method may be useful is as follows. Supposing two boilers are on and operating at a relatively low output level of, perhaps, 30% of maximum output, but the sensed bypass temperatures become low enough to create possible condensation in the primary heat exchanger, even with the bypass valve 20 of each boiler fully opened. One solution as proposed in U.S. patent application Ser. No. 10/809,116 entitled FORWARD CALCULATION ENERGY AUGMENTATION METHOD, now U.S. Pat. No. 6,904,874 is to increase the firing rates of each boiler, which in turn may push the output above its setpoint. However, this may cause instability in the system operation as well as increased cycling that may reduce the efficiency of the system. This may also introduce additional wear on the individual burners, gas valves, and other parts. Instead of cycling two boilers, a non-efficiency optimized method could be initiated in which only one of the boilers would operate, modulated to about 70% of its heat capacity.

Assuming efficiency curves as shown in FIG. 1, the efficiency of the operating boiler would be lower than having two boilers operating at a lower firing rate. However, the efficiency curve graph by itself does not provide a complete picture of the system operation. The bypass temperature problem would be solved with the high firing rate, and the system may operate with better stability.

Figure 3:
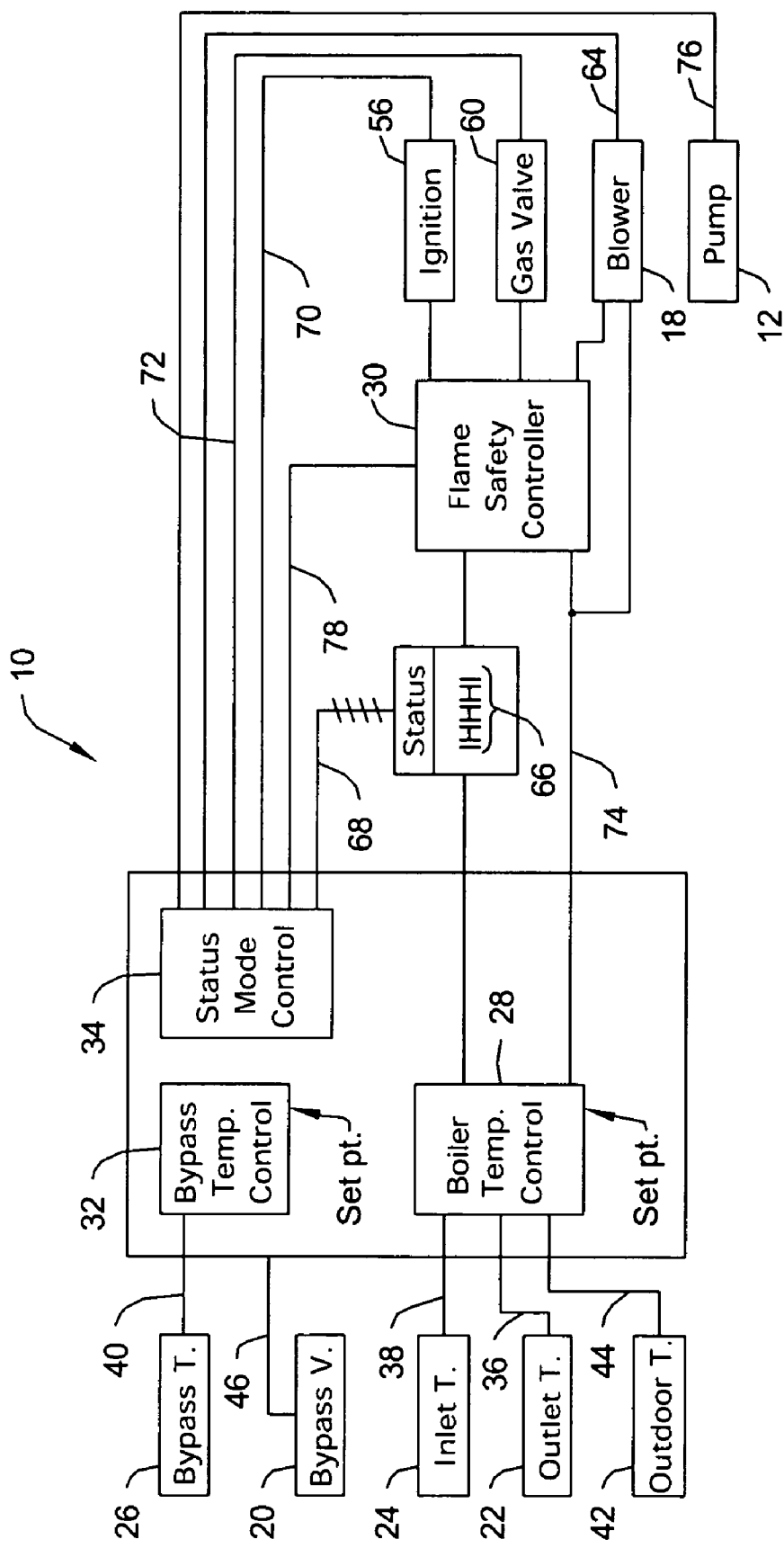
FIG. 3 is a functional block diagram for an illustrative boiler interface control (BIC)

FIG. 3 is a functional block diagram for an illustrative boiler interface controller (BIC). The BIC 10 includes a boiler temperature control module 28, bypass temperature control module 32, and a mode control module 34. The BIC 10 is shown interfacing with various elements of a boiler system.

In the illustrative embodiment, the temperature control module 28 receives a signal 36 from the output temperature sensor 22, a signal 38 from the inlet temperature sensor 24, and (optionally) a signal 44 from an outdoor air temperature sensor 42. The bypass temperature control module 32 receives a set point signal and a signal 40 from the bypass temperature sensor 26. The bypass temperature control module 32 provides a signal 46 to the bypass valve 20, and may also provide a signal to the flame safety controller 30 for controlling the firing rate (connection not shown), as needed.

A flame safety controller 30 is coupled to the mode control module 34 as well as the boiler temperature control module 28. In response to a signal 74 from the boiler temperature control module 28, the flame safety controller 30 communicates with the blower 18, ignition controls 56 and the gas valve 60 to control burning of gas in the boiler. The mode control module 34 receives status signals 64, 68, 70, 72, 76, 78 from the various system components. The flame safety controller 30 and the boiler temperature control module 28 are coupled together via a number of boiler safety switches 66, and a status signal 68 for the boiler safety switches 66 is also provided to the mode control module 34.

The BIC 10 of FIG. 3 is merely illustrative of one boiler control interface that may be used with the present invention. Typically the BIC 10 itself will not have direct control over safety measures taken using the flame safety controller 30 and boiler safety switches 66, but will instead record and provide status information of the boiler and safety switches 66. The BIC 10 also passes along signals regulating the heat output of the boiler. Additional external couplings may be provided for receiving data from or loading data or instructions to the BIC 10.

Figure 4:
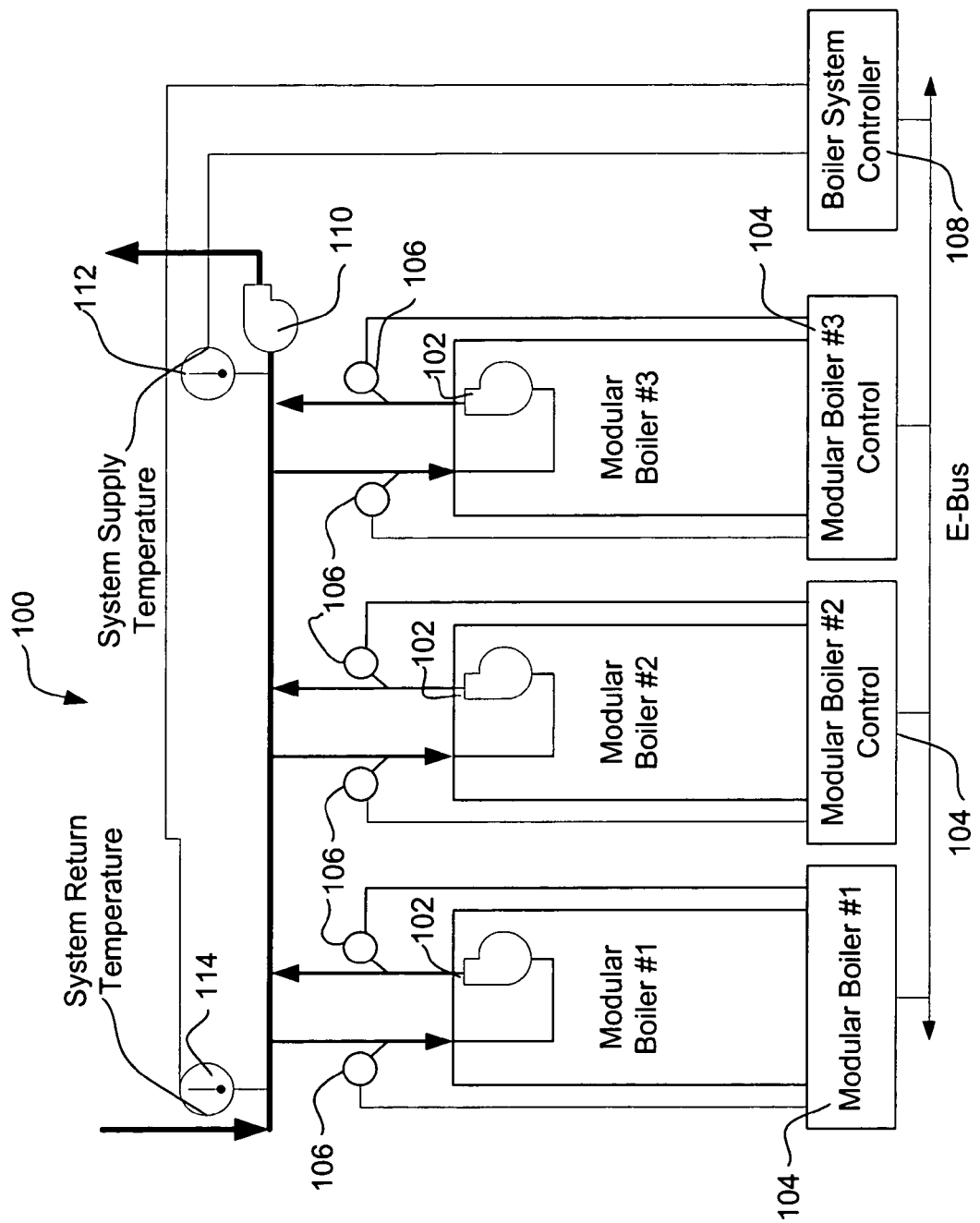
FIG. 4 is a schematic diagram for a boiler system incorporating more than one boiler.

FIG. 4 is a schematic diagram for a boiler system incorporating more than one boiler. The system 100 includes a number of modular boilers 102 which may, in terms of the system 100, be referred to as "stages" of the system 100. Each modular boiler 102 includes a modular boiler control 104, which also is coupled to boiler temperature sensors 106. The modular boiler controls 104 are connected via a bus line to a boiler system controller 108. A pump 110 is provided separate of the internal pumps of the modular boilers 102 to provide consistent system water flow independent of boiler flow, saving on both the pumps in each boiler 102 as well as maintaining even flow for the system regardless of how may of the stages (in the illustrative example, modular boilers 102) are active. If desired, the boiler system controller 108 may also be coupled to the pump 110. Though the modular boilers 102 have been described as single stage boilers, the present methods may also be applied where some or all of the boilers 102 are multi-stage boilers.

In the illustrative embodiment, the boiler system controller 108 is also coupled to a system supply temperature sensor 112 and a system return temperature sensor 114. The outputs of either or both of the sensors 112, 114 may be used by the boiler system controller 108 to indicate present load conditions (various other sensors may also be used independently or in conjunction with sensors 112, 114). Typically, the system return temperature sensor 114 provides an output that is compared to a set point, and the system 100 is adjusted by the boiler system controller 108 to adjust the heating output provided. The system controller 108 is able to send both enable/disable (or active/inactive) control signals and capacity or firing rate signals to the modular boiler controllers 104. When the system controller 108 calls for a modular boiler 102 to be active, the corresponding modular boiler controller 104 will activate the boiler 102. The boiler 102 will then activate an internal pump to pull circulating fluid into the boiler, causing it to be heated and returned to the system. While a parallel configuration is illustrated, any of a number of parallel, series, or combination parallel/series boiler configurations may be used and still be within the scope of the present invention.

Figure 5:
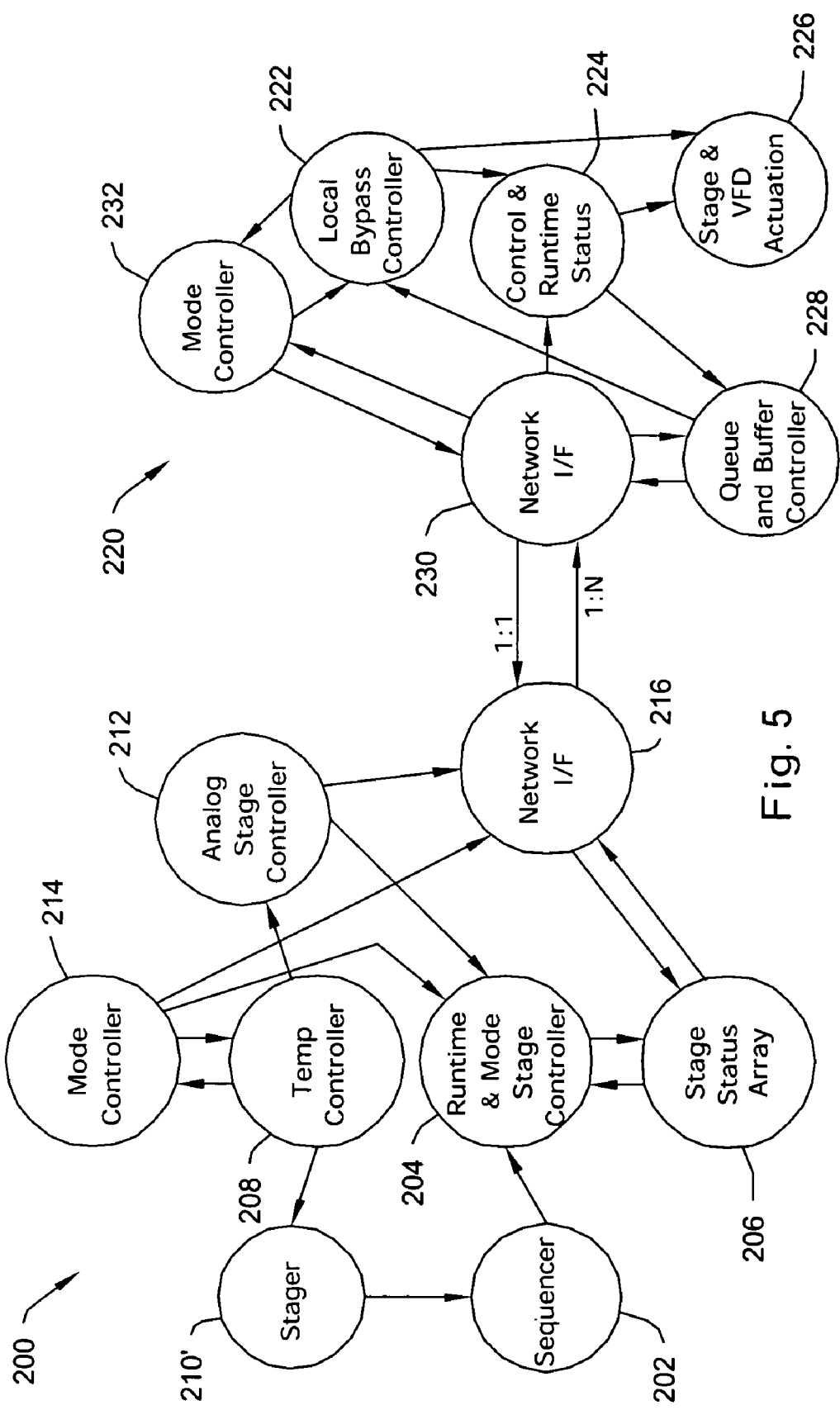
FIG. 5 is a software relationship diagram for a stager and system sequencer configuration.

FIG. 5 is a software diagram for a stager and sequencer configuration. Another stager and sequencer diagram is illustrated in U.S. Pat. No. 6,536,678 to Pouchak, which is incorporated herein by reference. The sequencer node 200 includes a data processing and control environment having a sequencer 202, runtime and mode stage controller 204, a stage status array 206, a temperature controller 208, a stager 210, an analog stage controller 212, mode controller 214 and a network interface 216.

The stage node 220 is a communications and control node that is coupled to an active energy source, and may take the form of a BIC 10 as illustrated above. The stage node includes a local bypass controller 222, control and runtime status 224 (which may take the form of an array or other data structure), a stage and variable firing drive actuator node 226, a queue and buffer control 228, and network interface 230. A mode controller 232 is also included in the stage node.

In operation, the temperature controller 208 provides a firing rate demand signal to the analog stage controller 212 and a stage temperature demand signal to the stager 210. The sequencer module 202 receives a stage call from the stager 210 and provides a sequencing information signal to the runtime and mode stage controller 204. The mode signal is further passed onto the network interface 216 for sending to individual nodes via the stage node 220 network interfaces 230, which is then passed to the individual node mode controller 232.

The analog stage controller 212 then provides a firing rate system signal and status signal to the network interface 216, again for passing along to the individual stages. The stage status array 206 receives stage number and firing rate signals from the runtime and mode stage controller 204 to provide status signals to the controller 204, as well as receiving boiler identification, mode and run-time information from the network interface 216, also for supply to the mode stage controller 204.

The stage status array 206 thus receives status information both from the sequencer 200 (via the runtime and mode stage controller 204) and from the individual stage node 220. Between the stage status array 206 and the runtime and stage mode controller 204, the operation of individual stages can be checked so that, if a stage is malfunctioning, the runtime and stage mode controller 204 may shift heat load to a different stage.

For certain operation methods, the runtime of individual stages may be tracked and used. For example, to equalize runtime between stages, the stage status array 206 and/or the runtime and mode stage controller 204 may keep track of runtime for individual stages. Then, when the stager 210 calls for heat, the runtime and mode stage controller 204 will have ranked the individual stages in terms of which stage should be used next to improve runtime equalization. The call for heat will then be passed along to the highest ranked stage/boiler.

Figure 6:
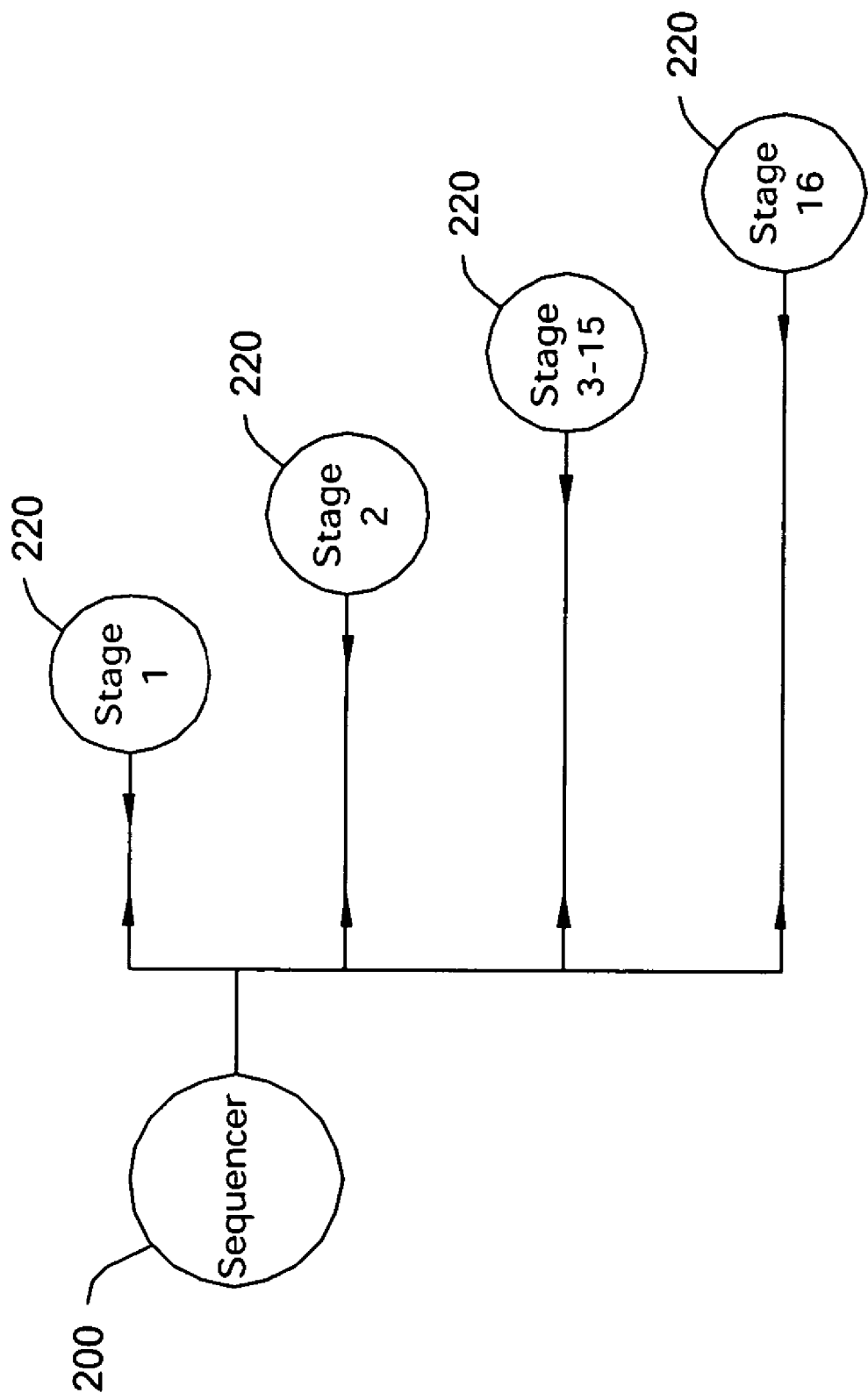
FIG. 6 is a control and communications method illustrating the configuration of a sequencer with a number of stages.

FIG. 6 shows a single sequencer 200 coupled to a number of stages. As denoted by the arrows, the sequencer 200 is configured to send and receive signals to and from each of a number of stage nodes 220. If the stages 220 have been ranked, the stage with the shortest runtime may be selected to respond to a next incoming call for heat requiring an additional stage 220. In one illustrative embodiment an Echelon Ionworks network is used, having a two wire bus making for simple two wire communications. Other wired and/or wireless networks may also be used.

Figure 7:
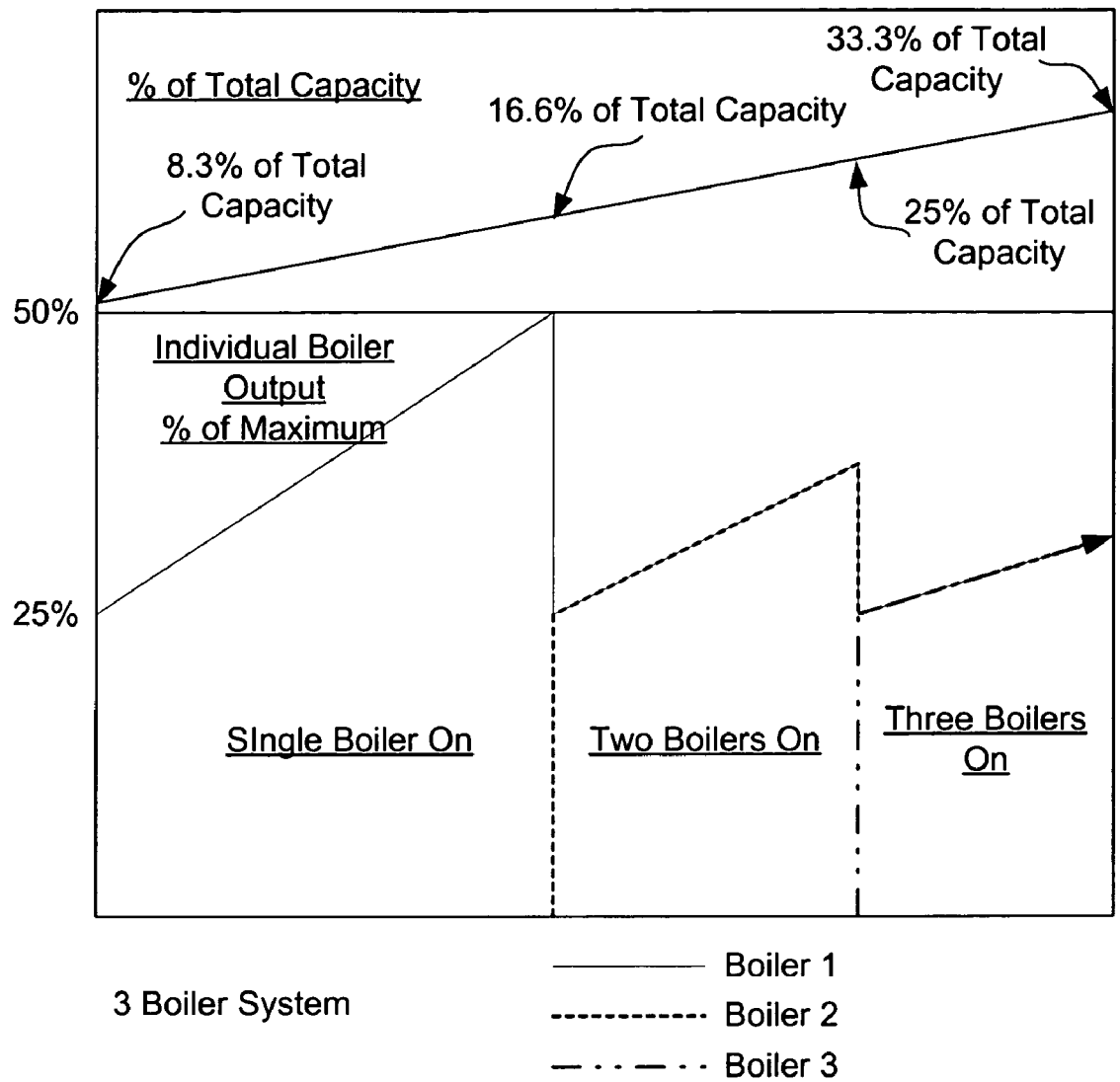
FIG. 7 shows graphically an optimized load method for a three boiler system.

FIG. 7 shows graphically an optimized load method for a three boiler system. As shown by the key below the graph, each boiler is represented with a different line weight/pattern. Going from left to right, the heat load is continually increasing. As the load increases, additional boilers come on. In the illustrative embodiment, and as additional boilers are added, each active boiler may share the heat load equally, but this is not required in all embodiments.

For the graphical example, each boiler is assumed to have a maximum efficiency when operating at 25% of maximum heat output. Typically, the firing rate is then scaled for 0% to 100%, with 0% firing rate understood as being the firing rate at minimum heat output. From a lowest capacity in a three boiler system, one boiler is on at its output capacity of 25%=about 8.3% of total system capacity, and the heating output goes up from left to right. The relative minimum output capacity may vary depending on the actual boiler used. For illustrative purposes 25% is shown.

In the illustrative embodiment, only a single boiler stays on until a second boiler can be added at about its maximum efficiency and minimum output 25%. Therefore the first boiler stays on alone until it approaches and reaches 50% of its maximum firing rate (about 16.6% of maximum system output), when the second boiler joins in. In the illustrative embodiment, when multiple boilers operate, a modulating step is adapted to modulate the individual boilers to equalize the load carried by each boiler. Thus, both boilers may operate at the same firing rate, which steadily increases with the increasing heat load.

Continuing with the above example, the first and second boilers remain on with the third boiler off until the third boiler can join at its maximum efficiency. This occurs when the first and second boilers are at 38% of their maximum output. Then, the third boiler is added with each of the three boilers operating at their maximum efficiency. Once all three boilers are on, the heat load is spread evenly across the three boilers.

The response output shown in FIG. 7 is an illustrative and somewhat idealized approach. Because inefficiencies and instability at around the switching points may occur, hysteresis may be added to the system by separating the staging and modulation aspects of the boiler system. In particular, as illustrated in FIGS. 8-9, a dead band may be provided, if desired.

Figure 8:
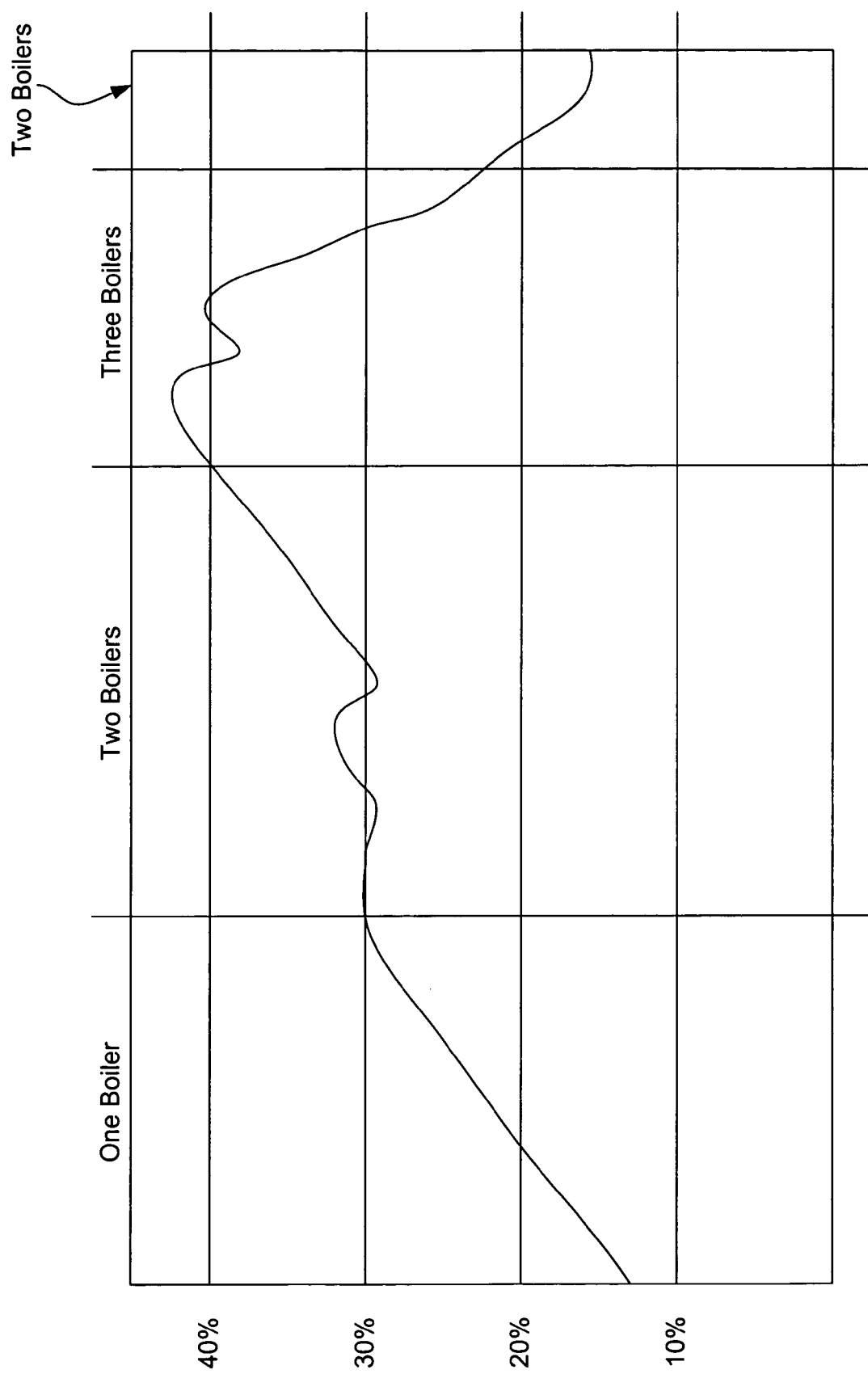
FIGS. 8 and 9 show graphically an example staging response to varying loads.
Figure 9:
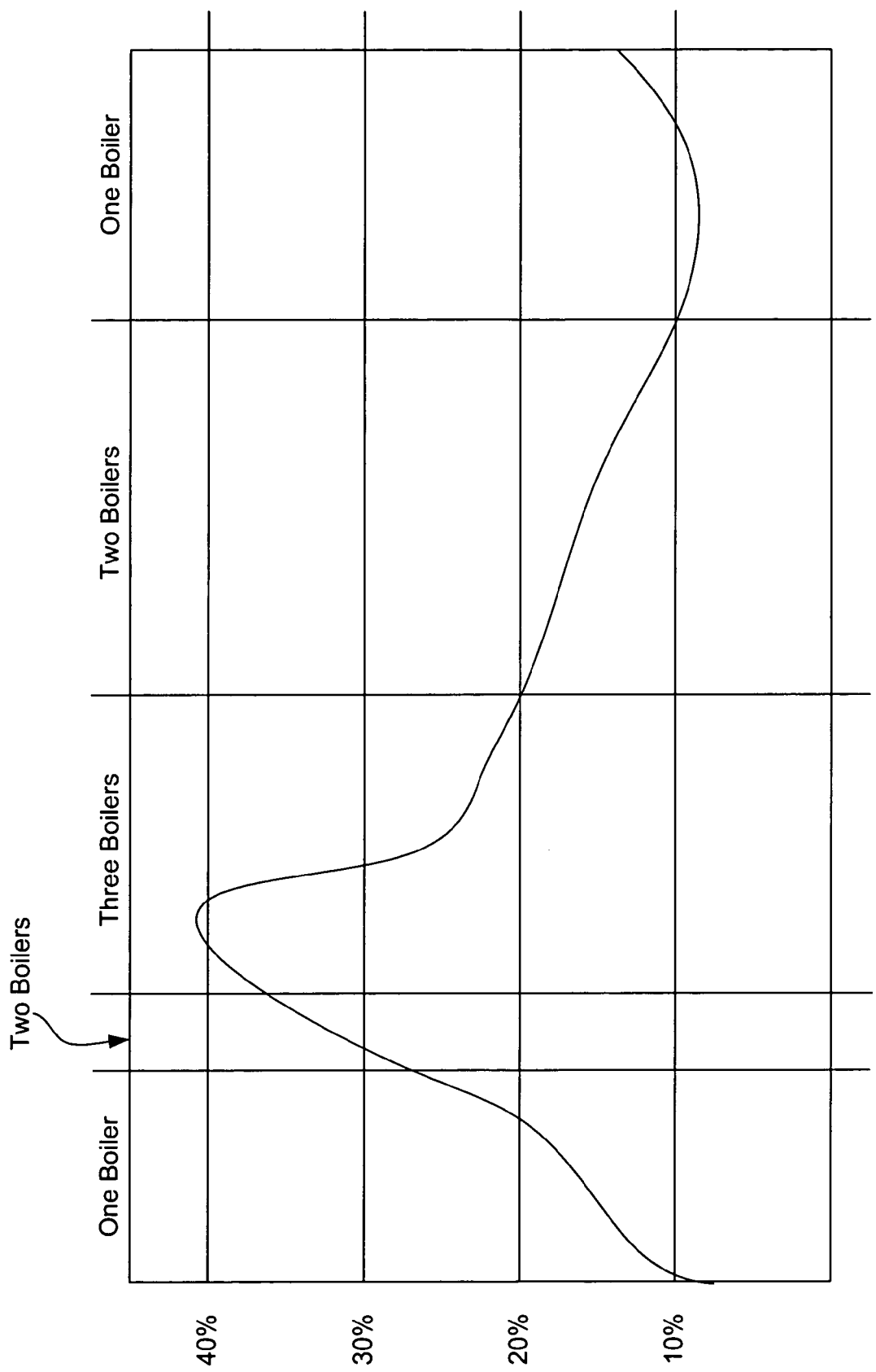

As further shown in FIGS. 8-9, the deadband may be both proportional and derivative. The illustrative deadband has been chosen at 10% of overall heating capacity, assuming a low rate of change, which is probably a fairly large deadband for most applications. Smaller and/or larger deadbands may be chosen as desired. It should be noted that the precision of the system increases as the deadband narrows. However, there is a tradeoff between precision/efficiency and system stability. The methods illustrated in FIGS. 8, 9 and 10 provide some example proportional/derivative staging methods. Additional illustrative methods using proportional/derivative calculations differently are shown below in FIGS. 12 and 16A-16B.

FIGS. 8 and 9 show graphically an example staging response to varying loads. The staging response is based on an assumed system of three boilers having maximum operating efficiency in the range of 30% of maximum heat output, with no minimum heat output (i.e. modulation smoothly to zero percent output for the hypothetical example boiler; it is likely that some minimum heat output will occur for most boilers). In FIG. 8, going from right to left, it can be seen that a load curve varying between 15% and about 45% moves up and down. The curve gradually approaches the 30% level with one boiler operating. Note that, ideally, the second boiler would come on at about 20% of overall capacity. However, to aid stability of the system, the second boiler is not actually added until the system reaches about 30% of overall capacity, such that the first boiler actually is operating near 90% of its maximum output before the second boiler is added. This deadband limits cycling of the individual boilers and improves stability.

Because an added boiler provides a minimum amount of heat (i.e. does not modulate smoothly to zero percent output), stability can be compromised by over-cycling. Also, a condensing boiler system, each time the boiler is cycled on, there is an increased level of condensation likely in the primary heat exchanger, which quickly warm up to avoid internal condensation. These, among other reasons, provide cause to avoid over-cycling.

Once the second boiler comes on, the two boilers operate with a deadband around the 25% level. A third boiler is not added until the output approaches the 40% level. Again, ideally the third boiler would come on at the 25% level, where each boiler could operate at a maximum efficiency at an output capacity of 25%. However, to limit cycling, the third boiler is not added until later, as shown. Just before the time the third boiler is added, the other two boilers operate at about 60% of their maximum output.

The illustrative system may include a first-on, first-off method, wherein boilers are turned off in the order they are turned on. For example, as the load falls, the first boiler will be the first one to be shut down, since it was the first one turned on. As noted, the command method is actually proportional-derivative. As can be seen, the load falls quite quickly as it approaches the 20% level. Because of the large (negative)

derivative of the load line, the first boiler shuts down before the 20% level is reached (at about 24% or so). Note that the derivative of the rising load line in FIG. 8 is relatively small, and so the rising load response is primarily proportional to the actual load.

Again, the deadband means that the first boiler does not shut down until the overall load nears 24%, meaning each of the three boilers operates at about 24% of its maximum heat output just before the first boiler goes offline. When the first boiler goes offline, the other boilers then spread the load equally, meaning that each boiler goes up to about 36% of maximum firing rate. While not shown in FIG. 8, if the load curve continues to drop, the second boiler would go offline when the overall capacity reaches about 10%, occurring when both the second and third boilers operate at about 15% of maximum heat output. Once the second boiler goes offline, the third boiler would jump up to operating at about 30% of its maximum heat output. If a minimum firing rate is defined for the boilers, this may raise the level at which boilers are turned off.

FIG. 9 illustrates an example where the rising load line is steep enough to highlight the effects of the derivative term. As shown, the second boiler turns on when the load line reaches about 27% partly because the load line is rising steeply. Again, when the load line reaches about 37%, the steep rise causes the third boiler to come on quicker than it otherwise would. However, as the load line gets below 25% or so, the slope evens out. Therefore the first boiler shuts down at about the system's 20% level, and the second boiler shuts down at about the system's 10% level in like fashion.

FIG. 10 is a chart illustrating various control responses in illustrative numerical format. The numeric values are purely illustrative and may represent scaled values for a system. The illustrative system has three boilers total for the purposes of simplicity. It can be seen first that the determination to add another boiler is a result of assessment of both the call percentage and the change of call percentage. For example, with a 26% heat output, if the derivative is less than four, the system uses only a single boiler, but if the derivative is greater than four, the system will activate an additional boiler. Further, there are some percentage levels where the proportional error dominates, for example, if there is only one boiler on and the percent call reaches 30%, the system will activate a second boiler regardless of the derivative value. Some changes take place in light of the previous number of boilers that are on and the proportional error only, as shown towards the bottom of the chart.

Figure 11:
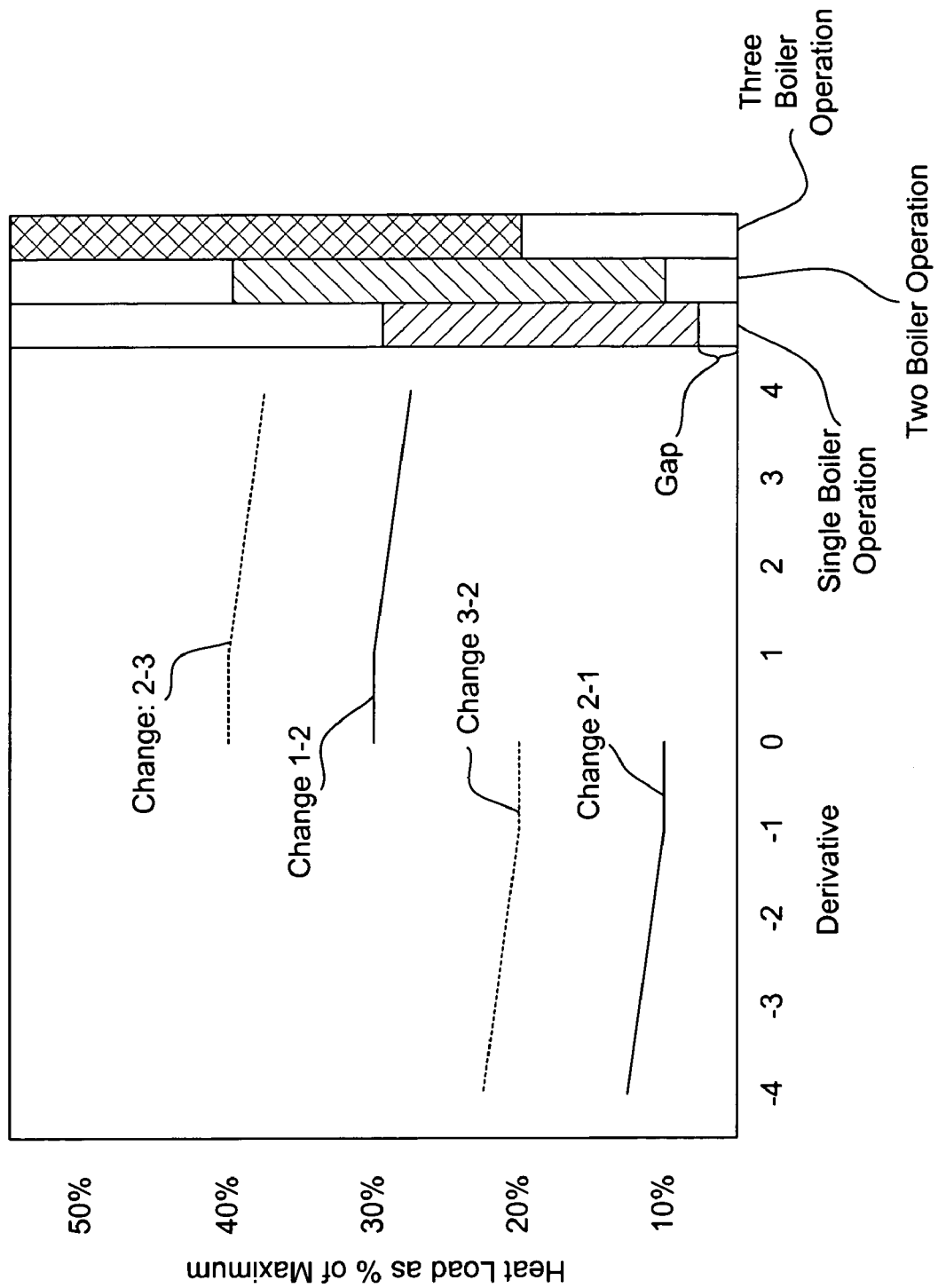
FIG. 11 is a graph illustrating operational ranges for a three-boiler illustrative example.

FIG. 11 illustrates, in a graphical format, the results from the illustrative example of FIG. 10. In particular, the system settings are such that, at given heat loads and derivatives, changes in the number of boilers operating are set to take place. On the right are ranges of operation for numbers of boilers. It can be seen that single boiler operation can occur up to a certain load point, while the top portion of the single boiler operation bar can be cut-off depending on the derivative at a given time. FIG. 11 illustrates a gap at the bottom of the overall output, which represents the lowest amount of heat production that a single boiler can provide. This low end gap is a result of the fact that a minimum firing rate is needed to operate a single boiler. However, throughout the rest of the curve, it can be seen that there are no further gaps, and indeed, the several boiler combinations overlap one another. This is in contrast to the gaps shown below in FIG. 15. The overlaps are further illustrated below in FIGS. 17A-17B, which show that an example system facing a single load level may have several solutions, depending upon the previous state of the system due to built in hysteresis of an illustrative method.

While the above charts and graphs provide illustrative examples of staging and modulation control methods, it should be understood that the exact numbers and levels, as well as the system size, are provided for the purpose of explanation. The present invention is not limited to the shown sizes, efficiencies, transitions or rates, and the graphs are not necessarily to scale. Furthermore, the methods illustrated herein may be modified in a number of manners, for example, to use either a first-on, first-off staging method or a first-on, last-off staging method. Another example includes a method where a hierarchy among several burners is established wherein one or more boilers may be preferred.

Also, while the examples in FIGS. 8-11 assume that the system heat load is used to create proportional and derivative control methods, other metrics may serve as the basis for control. In the following illustrative examples, the ongoing system error is determined by simpler comparison of a sensed temperature to a setpoint as well as monitoring of changes in the sensed temperature, making it both proportional and derivative. Then the ongoing system error is used to make changes to the system. As noted further below, the system error, for staging purposes, is compared to a throttling range than serves as a sort of deadband to the staging step. Further, the illustrative example assures that staging occurs in an efficiency optimized manner when the system is relatively stable by checking the rate of change of the sensed temperature.

FIG. 12 shows pseudocode 300 and a block diagram for an illustrative staging method. The illustrative staging method can be contrasted to the efficiency optimized staging method illustrated below in FIG. 15. The stager method begins by setting a current error (current_error) as part of a settings block 302. The pseudocode 300 shows the current error is based on a measurement of the temperature of system return water (sensor 114 in FIG. 4), with the setpoint being the desired temperature at that location. In other embodiments, current error may be calculated using a different temperature sensor such as the system supply temperature sensor (sensor 112 in FIG. 4), or may be based on a thermostat reading, a plurality of thermostat readings, or any number of other variables.

Next, a rate of change of the error (rate) is calculated, also in the settings block 302. It should be noted that the staging routine occurs every fifteen seconds, such that for the illustrative example, the rate variable shown is in terms of degrees Celsius per fifteen seconds of time. In the illustrative embodiment, the rate of change is also based on the system return temperature, and is the difference between the current measured value and an old measured value. In several embodiments, the system in which the stager routine of FIG. 12 would be operated, the sampling and calculating may be cycled through at different intervals having wide, such as once every five to one-hundred twenty seconds, though other intervals both larger and smaller may be used, as desired. Therefore, the subtraction step, because sampling occurs at known intervals, yields a rate related to the measured difference and the time interval of sampling.

Having calculated the rate, the illustrative method then updates the old measured value by replacing it with the new measured value, and storing the current measured value for the next cycle of the method (not shown in block form but part of the settings block 302 as well).

Next, the total error is set as a proportional/derivative measurement by subtracting the rate times a scaling factor, k, (in the illustrative example, the scaling factor is three) from the current error (again, part of settings block 302). This P/D error value may of course be modified by including a scaling factor not equal to one for the current error or by using a different scaling factor for the rate. Usually such changes may rely upon various system characteristics including but not limited to the cycling time, the size of boilers in use, the amount of circulating fluid, the types of heat losses anticipated, ongoing system uses, etc.

In some systems, where special uses are planned, additional meters or sensors may be used to modify the scaling factors. For example, if the boiler system is coupled to a pavement de-icing system, a sensor may sense outdoor temperatures to determine whether it is likely that de-icing will be needed. If so, the scaling factor for the current error may be reduced relative to the scaling factor for the rate to encourage use of a lesser number of boilers at higher firing rates to avoid problems that can result from low bypass temperatures.

The next two steps shown in the pseudocode 300 of the illustrative staging method in FIG. 12 set the upper and lower limits for the error value, limiting error to a range of +/−32 degrees Celsius. Again, this step may be part of the settings block 302. These limits may also be modified as desired. Next, the stage delay is decremented by one, as noted also in block 304. The stage delay is a factor used to preserve stability by limiting over-cycling due to quick staging.

In the illustrative embodiment, the stage delay, while not necessary, aids with stability because it takes time for a boiler to activate and begin producing significant amounts of heat, and because it takes time for some of the various sensors in the system to sense increased heat production. Thus, if staging is not delayed by a given period of time, the effects of newly activated boilers may not be sensed before more boilers are activated, leading to overshoot. For example, given an increase in load, a system operating on one boiler may have to add a second boiler. As the second boiler starts up, it will provide negligible heat for a period of time. The temperatures and error sensed may continue in a direction indicating additional heat is needed, without it being known what effect the second boiler will have once it is fully up and running. This could lead to a third boiler being activated, causing overshoot. The use of the stage delay may aid in preventing such overshoot.

The stage delay check 306 for the "ADD" loop 308 is performed in pseudocode with an IF statement checking for a stage delay of less than or equal to zero. Assuming a fifteen second cycle rate through the pseudocode, the stage delay check 306 for the "ADD" loop 308 delays for 8*15 seconds, or two minutes, after a boiler has been added. This dampens any overshoot when a stage is added. The stage delay check 310 for the "REMOVE" loop 312 only determines if the stage delay is less than or equal to four, meaning the "REMOVE" loop 312 is only disabled for 4*15 seconds, or one minute. Therefore, a stage may be removed faster than a stage is added, though there is still a delay in the illustrative embodiment. The method thus accounts for the fact that a stage, when deactivated, can stop providing heat to the rest of the system almost immediately.

If the stage delay check 306 yields a positive result, the method continues with the "ADD" loop 308. For the "ADD" loop 308, the check on the error and rate goes as follows. First, once in the "ADD" loop 308, the value for the stage delay is set to zero, preventing errors resulting from overflow of the stage delay variable if, as is typical, it is stored in binary form. Next, an IF statement compares the error to a throttling range, and compares the rate to a selected value. Note that this is the "ADD" loop 308. Therefore the rate is compared to a positive temperature value. As such, if the rate indicates that the temperature is rising at a high enough rate, the method will not add another boiler. It should be noted again that the rate is provided in terms of degrees Celsius per fifteen seconds. The value of $\frac{1}{128}$ used in the illustrative method indicates that a high degree of stability or a dropping temperature is a threshold for stage addition. If the temperature is shown to be rising, even with large error, it may remain unclear whether the error can/will be remedied without adding another boiler.

It should also be noted that when the measured temperature is below the setpoint, the error will have a positive value. If the error is above the throttling range, and the rate is low enough, the stage routine of FIG. 12 will then add a stage by increasing the number of stages requested variable, as shown. Next, to prevent over-cycling and limit the pace at which additional stages are activated, which may help minimize instability, the stage delay variable is reset to the value of eight, assuring a two minute delay before another boiler can be added and one minute delay before a boiler can be removed.

After the "ADD" loop 308, the next step is another stage delay check 310 for the "REMOVE" loop 312. If the stage delay check 306 for the "ADD" loop 308 fails, the method would instead go directly to the stage delay check 310 for the "REMOVE" loop 312 rather than going into the "ADD" loop 308. In any event, the method reaches the stage delay check 310 for the "REMOVE" loop 312.

As noted above, in the illustrative example, the "REMOVE" loop 312 operates with less stage delay than the "ADD" loop 308. While this is not required, it is included in some embodiments. If desired, the reverse of this method may be employed. For example, in an application where it is important to assure that circulating fluid temperatures remain above a certain level, quick addition and slow subtraction may be accomplished by modifying the stage delay checks discussed above.

If the stage delay check 310 is passed, the method continues with the "REMOVE" loop 312. As shown in the pseudocode 300, the remove loop compares the error to the negative of the throttling range and the rate to a temperature rate value. The reason for the negative sign on the throttling range is simple: error will be negative when the temperature is above the setpoint. Likewise, the rate is checked to be greater than a negative value because, even if the temperature is above the setpoint and out of the throttling range, if the temperature is dropping quickly it may yet fall back into the range. In other embodiments, the comparisons in the "ADD" loop 308 and the "REMOVE" loop 312 may be different in a number of ways. For example, using a different throttling range for each loop 308, 312, or a different error or rate calculation can change the system operation. If the IF condition of the "REMOVE" loop 312 is met, then the method reduces the number of stages requested by one and sets the stage delay to eight again.

After the "REMOVE" loop 312 is complete, the method goes to a wait block 314 where it waits for the next cycle through the pseudocode to occur. As noted above, each cycle through the pseudocode may be spaced by a time period of, for example, ten to one-hundred-twenty seconds, though both longer and shorter intervals may be used. For the illustrative embodiment, the cycle through the pseudocode has a period of about fifteen seconds. If the stage delay check 310 for the "REMOVE" loop 312 fails, the method also goes to the wait block 314.

With the stager routine of FIG. 12 complete, the method goes on to perform individual stage modulation. In an illustrative example, the method illustrated by the block diagram and pseudocode of FIG. 13 may be performed while the stager routine is in the wait block 314, or each may be performed as subroutines of a larger stager/modulation method or routine. For example, each could be a callable function, and instead of a wait block 314, the callable function would return to the main program.

Figure 13:
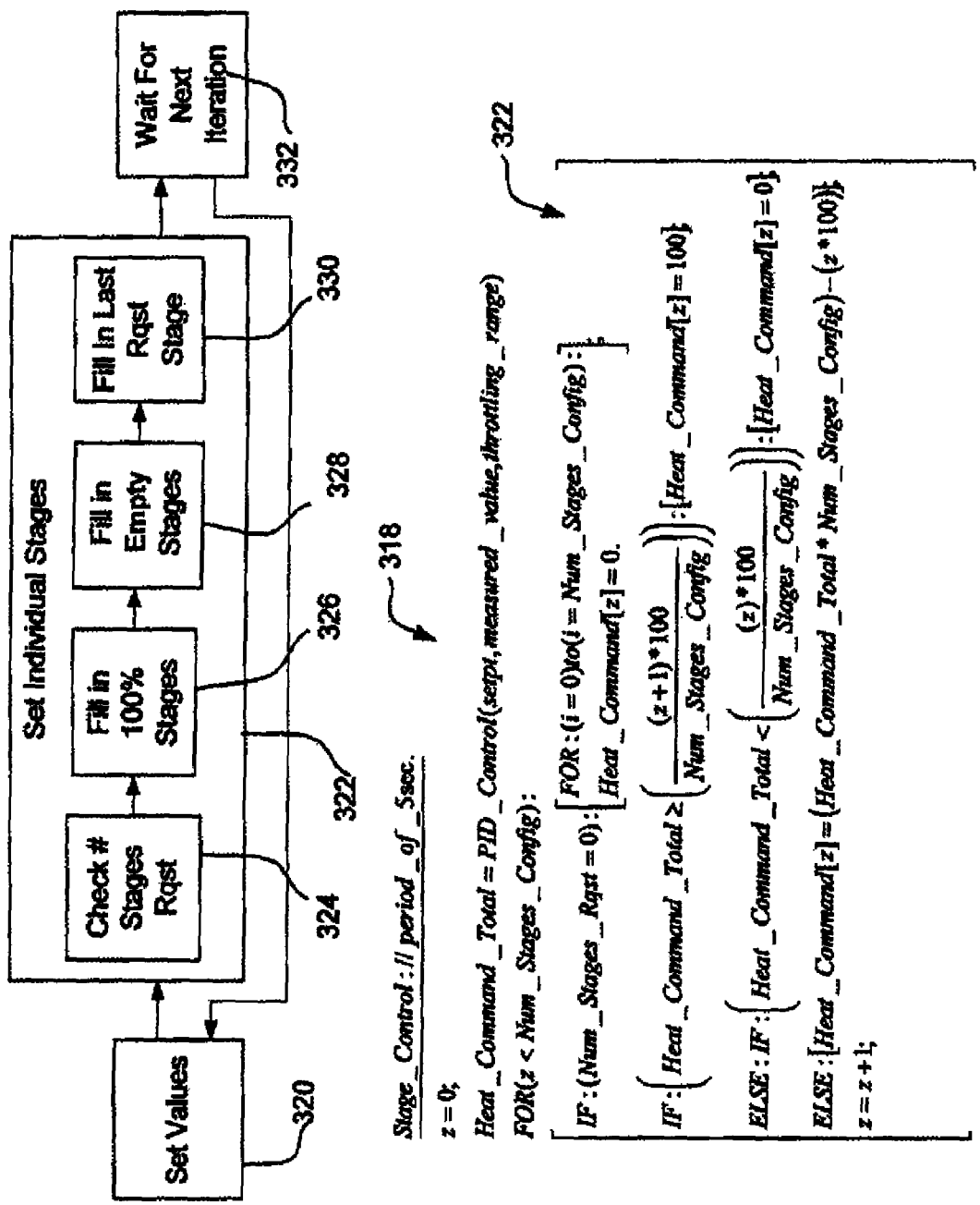
FIG. 13 shows a block diagram and pseudocode for an illustrative modulation method.

FIG. 13 shows a block diagram and pseudocode for an illustrative modulation method. Again, the modulation method of FIG. 13 is a non-efficiency optimized modulation method, in contrast to that of FIG. 16. As noted in the pseudocode, the illustrative method has a cycling period for the modulation of five seconds, such that modulation occurs more quickly and more often than staging. The actual period for modulation may be selected as desired and may be greater or less than that noted. A first step 320 is to set the values for use in the modulation method, which as shown in the pseudocode 318 includes setting z to zero and setting the total heat command to the amount of heat demand at the time. The total heat command will be a value between zero and one hundred, corresponding to a heat call for zero to one hundred percent of maximum output.

Because of minimum output levels that may exist with individual stages, the actual heat provided by each stage may not always be the same as the heat command supplied to the stage. In an illustrative example, the heat output of a stage, as a percent of the stage's maximum heat output, may be one of: zero, if the stage is not enabled; the minimum heat output, if the stage is enabled but the heat command is below the minimum heat output; a percentage corresponding to the heat command level if the stage is enabled and the heat command is above the minimum heat output level and below the maximum heat output; or 100% if the heat command is above the maximum heat output.

Next, the individual stages are set in a loop 322. For each z less than the number of stages configured, the subsequent instructions are performed. A first check is on the number of stages requested, as shown at 324. If no stages are requested, then the heat command for each stage is set to zero. Next, the stages that can be set to 100% output (maximum output) are set at that level. This is done using a subtraction type of process, wherein if the total heat command is greater than one hundred times one plus z divided by the number of stages configured, the $z^{th}$ stage is set to 100%.

For example, if the total heat command is set at twenty (20% of maximum heat output), and there are sixteen stages, for z=0 (the first stage), the comparison to heat command total would yield 20=Heat_Command_Total>((0+1)*100)/16=6.25. Therefore the first stage (z=0) would receive a heat command for its maximum output (Heat_Command[z]=100). Given the same numbers, the second and third stages (z=1 and z=2) would also be set to their maximum output. Continuing, for the fourth stage (z=3) the comparison would yield an untrue result, since 20<25=((3+1)*100)/16, and no more 100% stages would be filled, completing that step 326.

Then, the empty stages are set in step 328. If the total heat command is less than z times one hundred divided by the number of stages configured, then the $z^{th}$ stage is set to zero. For example, using the above numbers, for the fifth stage (z=4), 20<4*100/16=25. For higher stages, the inequality would again yield a true result, such that for z greater than or equal to four, the stage would be set to zero heat command.

Because staging and modulation are separate, the zero heat command stages may still provide heat even with a zero heat command. In particular, the stages may have a minimum heat output if they are enabled. Using the above example, if the fifth stage (z=4) is enabled, then the fifth stage would actually provide a heat output at its minimum output level, even though the heat command for that stage is zero. Until the staging method determines the fifth stage should be disabled or deactivated, heat output by the fifth stage may continue to occur.

Figure 14:
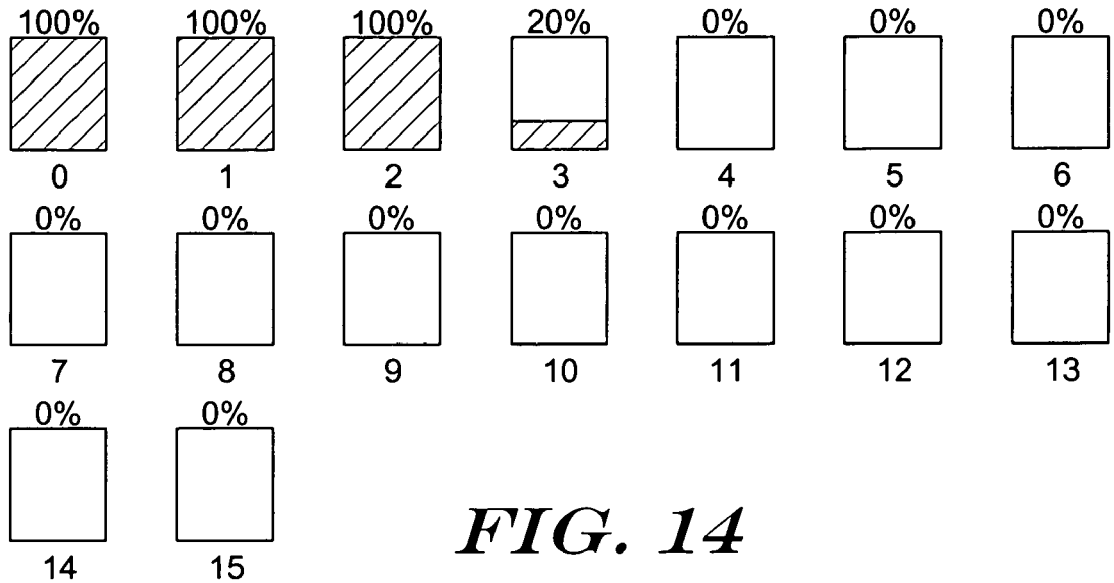
FIG. 14 illustrates in graphical form the results of the illustrative staging and modulation performed in FIG. 13 given certain set conditions.

Next, the last requested stage is filled in at block 330. This is the last ELSE statement in the pseudocode 318 for the individual stages loop 322. In particular, the $z^{th}$ heat command, failing the earlier IF and ELSE IF statements, is set to the product of the total heat command times the number of stages configured less z times one hundred. So, using the above numbers, fourth stage (z=3) would be set to (20*16)−(3*100)=20. So heat command to the fourth stage requests twenty percent of its maximum output. The results for this numeric method are shown in FIG. 14. The numbers below each box represent the value for z for that box; the number above each box represents the heat command for each stage. Finally, the individual stage modulation loop 322 loops back onto itself by incrementing to the next z, repeating until z reaches the number of stages configured. After all the individual stages are set, the method goes to wait for the next iteration in step 332, which may include returning to a main method, as well as going through another stager sequence such as that of FIG. 12.

Figure 15:
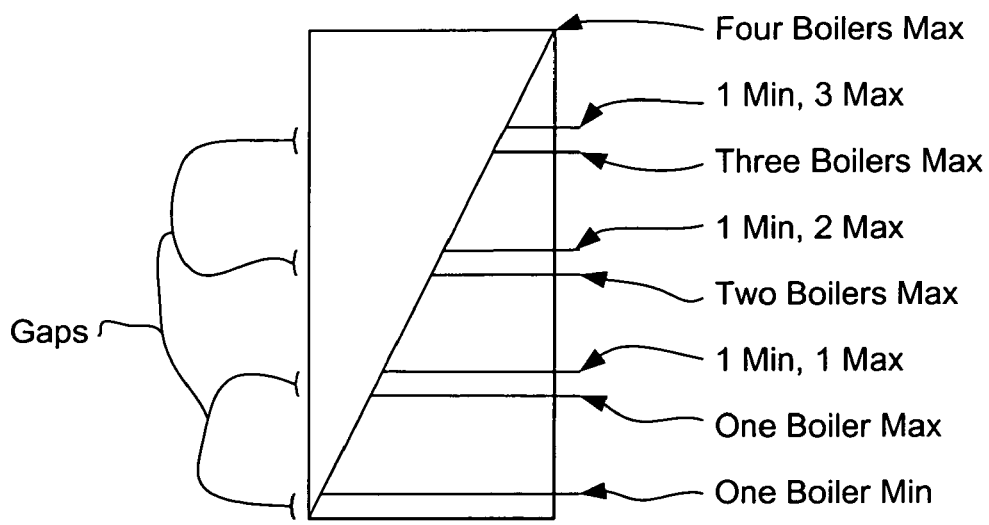
FIG. 15 illustrates possible gaps in output for a system operated as illustrated in FIGS. 12 and 13.

FIG. 15 illustrates a "gap" in heat production. Using a method as in FIGS. 12-13, the output of a system cannot be met using certain heat command levels in a stable fashion (i.e. without cycling). For example, FIG. 15 illustrates a system having four boilers and shows the output capabilities of the four boilers. FIG. 15 assumes that each boiler has a minimum output level of 20%. It can be seen that, for the overall output of the system, there are gaps in the output.

For example, a boiler may operate between 25% and 100% of its maximum output, but may not be able to throttle down to 10% output relative to its maximum output. If the heat load at a given time would require three boilers on at 100% and one boiler on at 10%, the load cannot be met without cycling a boiler on and off. The heat output in response to the demand will be in excess of the load at some times and be less than the load at other times. To eliminate such a gap, in an alternative or further embodiment of the method of FIGS. 12-13, the system may be adapted to call for two or more active boilers to have equal loads of less than 100%. For example, using the above scenario of a heat load requiring three boilers at 100% and one boiler at 10%, the solution may be to use two boilers operating at 100% and two boilers operating at 55%. As shown above in FIG. 11, an efficiency optimized or more intelligent method can reduce or eliminate gaps as well.

Figure 16A:
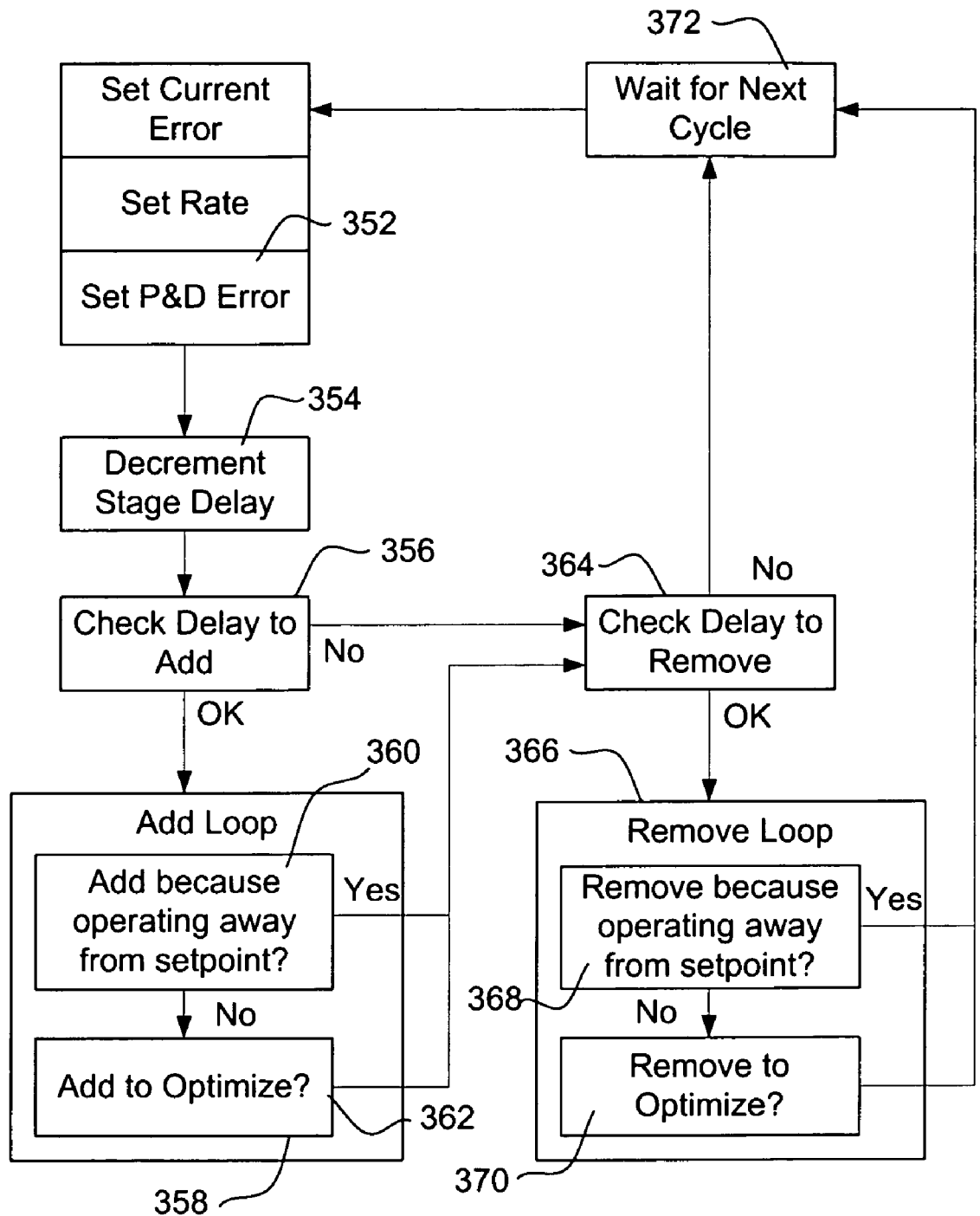
FIGS. 16A-16B show a block diagram and pseudocode, respectively, for an illustrative efficiency optimized staging method.
Figure 16B:
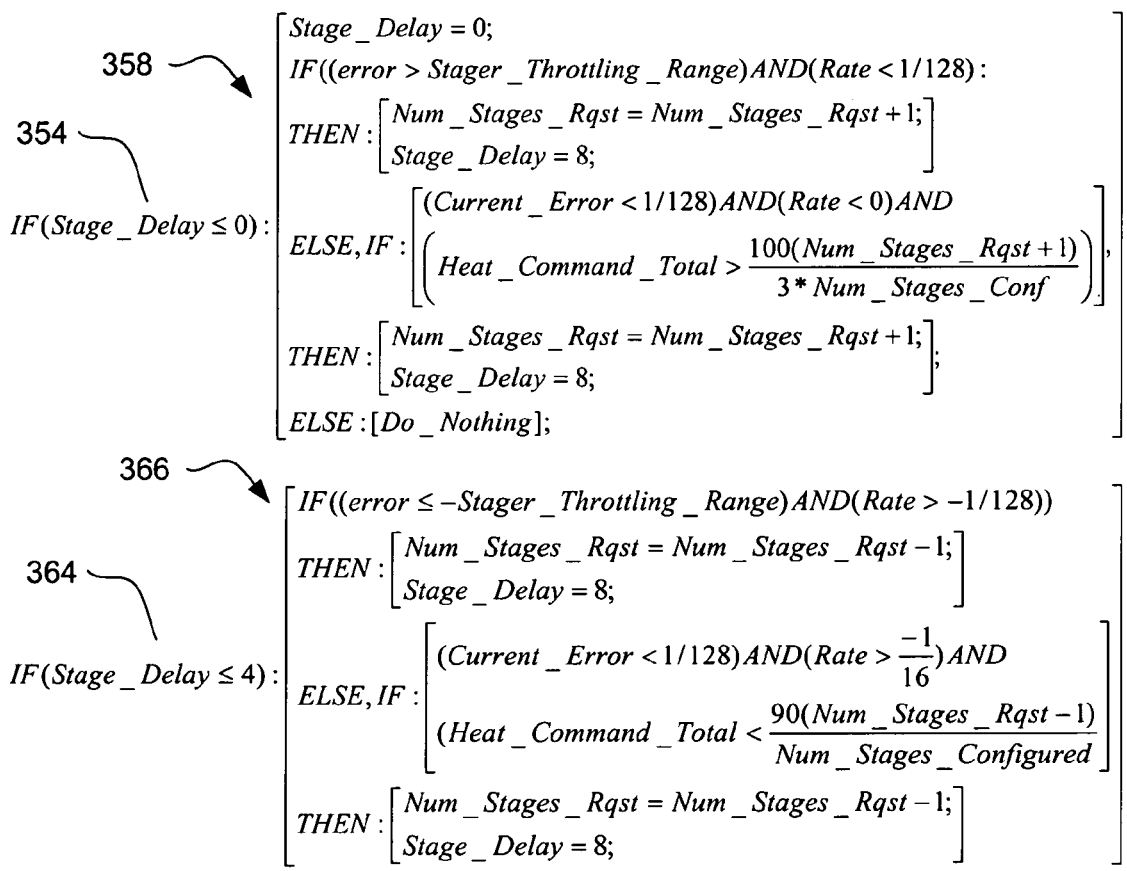

FIGS. 16A-16B show a block diagram and pseudocode, respectively, for an illustrative efficiency optimized staging method. The block diagram of FIG. 16A provides a higher level abstraction of the pseudocode of FIG. 16B. As above, the illustrative staging step may have a period of about fifteen seconds, though any staging step period may be chosen, as desired. The illustrative method begins with a settings block 352, which includes setting the current error, rate, and proportional/derivative error, in similar fashion to that explained above in FIG. 12 with reference to settings block 302. Next, the stage delay is decremented as noted at block 354.

The method continues by checking the stage delay for addition 356. If the condition for the stage delay is met at 356, the method goes into the "ADD" loop 358. The "ADD" loop 358 includes two parts. First, a stage may be added if the system is operating too far away from a setpoint, as determined at 360, and next (if no stage was added for setpoint reasons), a stage may be added to optimize the system as determined at 362.

As shown in the pseudocode of FIG. 16B, the add for setpoint reasons step 360 is similar to the add step shown in FIG. 12, where the error is compared to the stager throttling rate and the rate is checked to see whether it is below a maximum amount. The extra portion, the addition to optimize step 362, includes three comparisons. The first two comparisons are whether the current error is less than an amount (indicating that the system is operating close to its setpoint) and the rate is negative (indicating that the measured temperature is dropping).

To further check whether another boiler can be added, the method also compares the total heat command to a constant times the number of stages requested divided by the number of stages configured. The constant may vary, but is illustrated as being 100/3, which, for the illustrative example, is a level chosen for use with a number of stages that have minimum outputs of 25% (which is also the level of maximum efficiency). Thus another boiler can be added if conditions are sufficiently stable and adding another boiler will cause the existing boilers to operate at about 33% of their maximum output, giving some cushion above the minimum output level. If these conditions are met, as shown in the "THEN" statement, another boiler is added to the number requested, and the stage delay is set back to eight to delay more additions.

It should be noted that for the method illustrated in FIG. 16B, the "efficiency optimized" portions of the method are adapted for use when system conditions are relatively stable. Where system load or output is varying, the efficiency optimized portions may not have effect due to ongoing modifications of output and, perhaps, staging, occurring as a result of the changing system conditions.

Under the conditions of FIG. 16B, the system is checked for its stability and operation near the setpoint. For example, if the sensed temperature is rising at a high rate, the rate comparison fails because the rising temperature indicates a lack of stability. (If desired, the rate comparison may be a range comparison, i.e. $X<Rate<Y$). If the current error indicates operation significantly below setpoint, the system is not stable because modulation/staging is needed to get back to setpoint, so the current error comparison would fail.

These limits leave one option where there could be a lack of stability without violating the current error and rate comparisons: the current error would be negative (high sensed temperature) and the rate negative (i.e. the temperature is falling and the current error is becoming more positive). In this circumstance, however, the total heat command should be small, since the PID used to generate a heat command signal would be either small or negative, depending on the system configuration. This would allow system water to drop down to the setpoint temperature. The low heat command signal, however, means that the third comparison would likely fail when the first two do not, unless the system is operating with a high degree of stability.

After the add loop 358, or if the stage delay check for addition 356 fails, the method goes to a stage delay check for removal 364. As shown in the pseudocode, the stage delay is compared to four, rather than zero, meaning the method waits longer to add a boiler than it does to remove a boiler from the number requested. Again, the remove loop includes a first part checking whether a stage should be removed because the system is operating too far away from a setpoint, as noted in block 368. This removal for setpoint reasons block 368 operates similar to the remove loop of FIG. 12. Error is compared to a throttling range and the rate is compared to a negative value, and, if both conditions are met, the number of stages requested is reduced by one and the stage delay is set to eight.

Next, the remove loop 366 performs a remove to optimize step in block 370. In this step, the current error must be less than a prescribed value, indicating the measured value is close to or greater than the setpoint. Then, the rate has to be at least a prescribed value, meaning the temperature is either rising or, at worst, falling slowly. The capacity to remove a boiler is also checked. In particular, if the total heat command is less than a constant times the number of stages requested minus one divided by the number of stages configured, the capacity requirement is met.

If each of these conditions are met, as shown in the THEN part, the number of stages is reduced by one and the stage delay is again set to eight. With the constants chosen in the illustrative example, the capacity check determines, in summary, whether the deactivation of one of the active/requested boilers would cause the heat command on the remaining boilers to climb above 90% of their maximum level. A different percentage level may be used in other embodiments. Finally, as shown in the block diagram of FIG. 16A, the method goes from the remove loop (or, if the stage delay check for removal 364 fails) to waiting for the next cycle as shown at 372.

As explained above, these checked conditions are adapted to assure system stability. However, in the case of the remove loop 366, the situation is reversed. In particular, the rate must be greater than a value, and the current error must be less than a value. For instability to be present, the positive rate would have to be relatively large. However, if the rate is large and positive, it indicates continuing increase in output heat, which in turn would likely occur if the heat command total were large. However, the third condition for the efficiency optimized part of the remove loop 366 prevents this type of unstable conditions from causing an active boiler to be removed.

FIG. 17 shows pseudocode and a block diagram for an illustrative efficiency optimized modulation method. The period for modulation in the illustrative example is again about five seconds, which is less than the staging period, though any modulation period may be chosen as desired.

As with the modulation method of FIG. 13, the efficiency optimized modulation method starts by setting values 380, including starting with z at zero, and setting the total heat command. Next, the method continues by going into a loop that is performed for all configured stages (z). First, the number of stages requested is checked in block 382; if no stages are requested then the heat command for each stage is set to zero. If at least one stage is requested, then the heat command for each stage is set equally in block 384. The heat command for each stage is equal to the result of the total heat command times the number of stages configured divided by the number of stages requested.

To make sure each heat command is valid, if the stage heat command has been set to a value greater than one hundred, the heat command for the stage is set back to one hundred. The stage heat command could exceed one-hundred, for example, if the stager has not yet added sufficient stages to meet the present/current heat command. This may occur, as noted if the stage delay variable is preventing staging. By keeping staging and modulation separate, each step may be simplified, and use of a stage delay variable is also simplified. Finally, the method waits for the next cycle at 386 after values for each stage have been set to zero, one hundred, or the noted product.

Figure 18A:
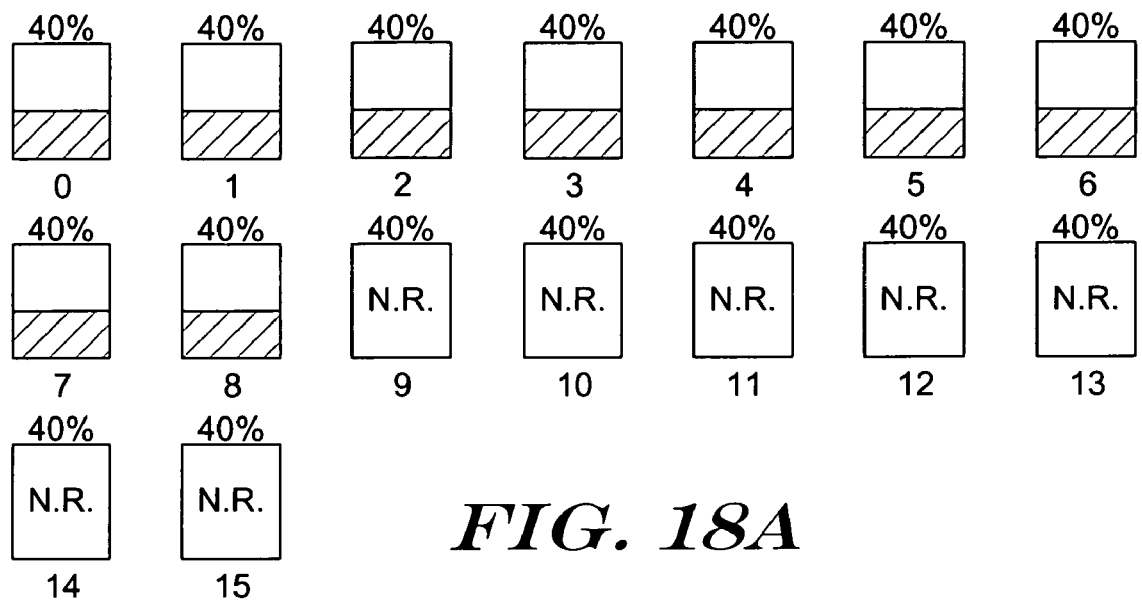
FIGS. 18A-18B illustrate in graphical form the results of an optimized method as in FIGS. 15 and 16A-16b in response to the conditions of FIG. 14 as coming from either light or heavy heat load conditions.
Figure 18B:
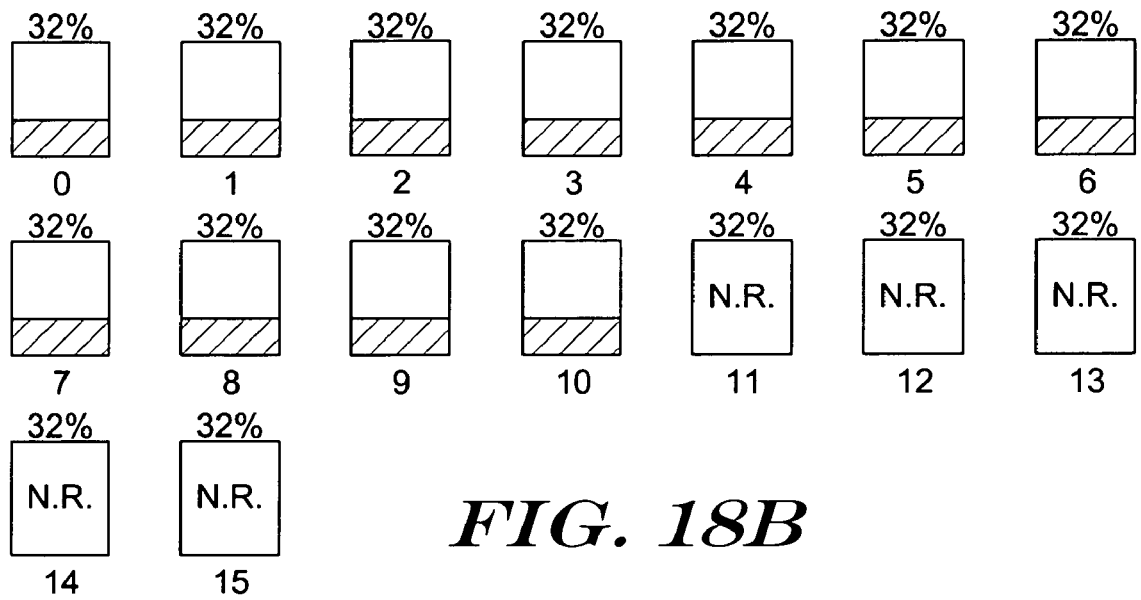

FIGS. 18A-18B illustrate an efficiency optimized response to a load where the load is similar to that applied in FIG. 14. The two figures highlight hysteresis built into the system. For example, when coming from a light heat load, stability concerns encourage hysteresis to keep the system from adding boilers too quickly. Thus, with a sixteen boiler system as illustrated in FIG. 18A and a load that is 20% of the overall capacity of the system (as was the case in FIG. 14), when coming from a light load, may operate eight boilers (the active boilers) at 40%. If coming from a heavy load, the system may instead operate ten boilers are 32%, as shown in FIG. 18B. Following the methods shown in FIGS. 16A-16B and 17, each boiler has an identified heat command, however, some boilers do not operate. For each of the examples, boilers showing the indication N.R. are non-requested boilers. The non-requested boilers are not enabled to fire (inactive boilers), even though a heat command is identified for each.

It should be noted that the particular boiler numbers and/or the particular boilers selected are shown for illustrative purposes. In an actual system the boilers may be selected by a stager in a number of manners, including at random, in a rotating first on/first off cycle, in a first on/last off sequence, or in a run-time equalized manner. Further, for some embodiments the illustrated constants shown herein above may vary with the size of system being used, the heat load anticipated, the types of uses contemplated, and a myriad of other factors. The present invention is suitable for adaptation in a number of ways to various scenarios.

Figure 19:
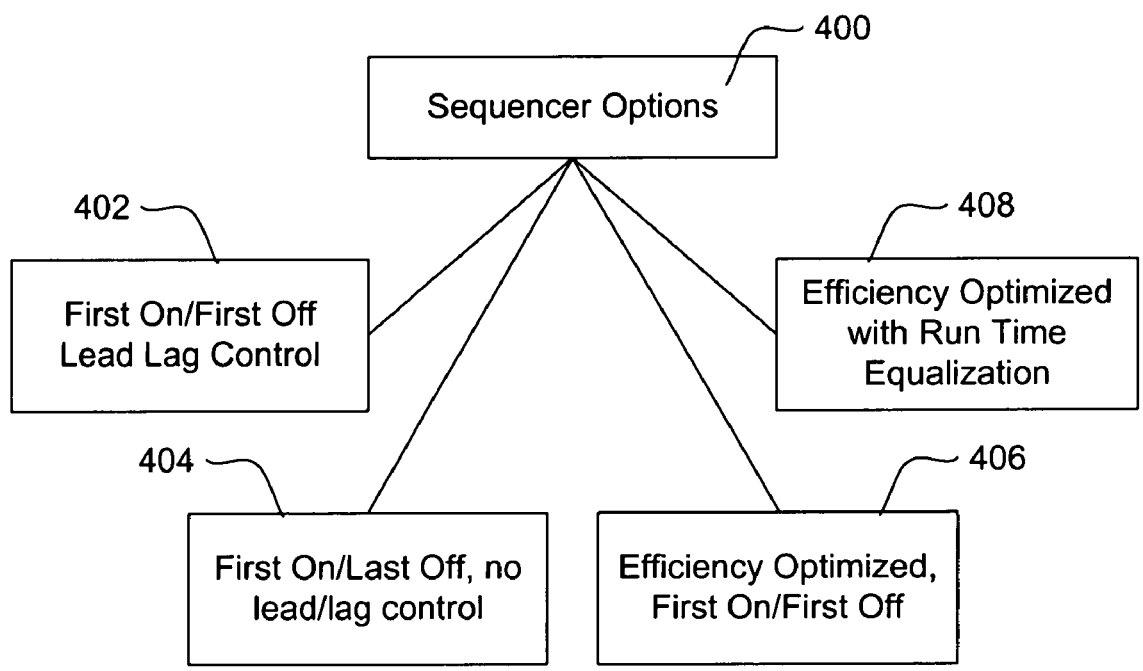
FIG. 19 illustrates sequencing options for an illustrative multi-stage sequencer.

FIG. 19 illustrates sequencing options for an illustrative multi-stage sequencer. From a sequencing options module 400, four options are available in the illustrative example. A first on/first off lead lag option 402 is one in which stages are turned on and off in the same order, such that during a transition from a heavier load to a lighter load, the stage that has been on the longest is the one which is turned off first. A first on/last off option 404 has no lead/lag control, such that the first burner turned off during a transition to a lighter load will be the last one that came on. This option 404 may be used, for example, when a system has a new boiler that is better (cleaner, quieter, or more efficient, for example) and a number of older boilers, with the new boiler being preferred or placed at the top of the hierarchy. The less preferred boilers may be ordered or treated in a hierarchy so that they are added last and removed first.

A first efficiency optimized option 406 uses a first on/first off lead lag option as noted above. A second efficiency optimized option 408 uses runtime equalization. Runtime equalization can be performed by monitoring how much each boiler is operated using an array of counters. When it comes time to shut down a boiler as load decreases, the runtime equalization method will determine which boiler has operated relatively more than other boilers, and will shut down that boiler first. Also, in response to a request for an additional boiler, the runtime equalization will determine which inactive boiler has been operated for the least amount of time, and will identify that boiler as the one to be activated next in response to the request.

The sequencing options module 400 may operate in response to an input such as a switch, an on-screen option selectable from a boiler interface, or any other suitable user input. In further embodiments, the sequencing options module 400 may operate in response to sensed conditions. For example, if a boiler is taken offline for maintenance, or if a boiler safety mechanisms disable a boiler, the sequencing options module may receive a signal indicating that a boiler is no longer configured, and may operate remaining boilers using a run-time equalized option to compensate.

Alternatively, if conditions wherein higher firing rates are desired (such as when return water temperatures are very low) are sensed, even if the load is light, the sequencing options module 400 may operate to select a non-efficiency optimized method, since these methods will often operate several boilers at higher firing rates as illustrated above in FIGS. 14 and 18A-18B. Finally, if variance about a setpoint is sensed, indicating perhaps that the setpoint and then-occurring load fall into one of the "gaps" noted above in FIG. 15, an efficiency optimized method may be selected to avoid such variance. Alternatively, if there is significant variation in the heat load or total heat command, an efficiency optimized method may be avoided to avoid system instability.

Another sequencer option may be to select a method during a particular time to create stage rotation when desired. For example, if a stage or boiler is operated continuously for an extended period of time, it may be desirable to rotate the boiler out of operation if this is possible. The rotation may be established to allow purging of a boiler flame chamber, for example, or for diagnostic purposes. In an illustrative example, if an eight-stage system is operating at 50% of heat command for an extended period of time, in an efficiency optimized method, each stage may be operated at about 50% of capacity all the time.

To rotate boilers out of operation, a non-optimized method may be chosen for a time period to turn off several of the boilers and concentrate load, for a time period, on less than all the boilers. For the illustrative example, a non-optimized method may have four of the eight boilers operating at near capacity for a time period while the other four boilers go through post-fire purging and any other desired safety, cleaning, or diagnostic steps. Then the system may bring the four boilers turned off back online by going back to an optimized method. Next, a non-optimized method having runtime equalization may be chosen, such that the four boilers that did not shut down during the first rotating step would be shut down, allowing, for example, purging, cleaning, or diagnostic events to occur.

For the purposes herein, a multi-stage boiler system may include a number of boilers that may be, for example, components of a modular boiler system. While the example embodiments in FIGS. 12-18B were configured for use in a multi-boiler context, these methods are readily adapted for use in any multi-stage boiler system. Further, while several of the following illustrative embodiments are shown in terms of continuously adjustable boiler firing rates or modulation, the methods are also readily adapted for use in discretely modulated boilers having a number of identified firing rate levels (for example, high/low/off, high/medium/low/off, off/1/2/3/4/5, etc.).

In some embodiments, the present invention contemplates several methods of controlling a multi-stage boiler system which include more than one selectable control mode. The following descriptions show a number of selectable control modes that may be incorporated in a number of combinations in various embodiments. In some embodiments, one or more of the following described control modes may be available as a stand-alone method for boiler control. If multiple control modes are provided, the particular mode for use at any given time may be selected by a user, preprogrammed, or may be selected using methodology that takes into account environmental conditions, sensed conditions, present usage, past usage, temporal conditions, or the like, using an automated or semi-automated method.

The example embodiments illustrated above and in particular in FIGS. 12, 13, 16A, 16B, and 17 may be performed in another manner also suited for stability. In one illustrative embodiment, a staging method for determining the number of stages in a multi-stage system to operate, such as those of FIG. 12 or FIGS. 16A-16B, is performed at a first interval. A stage modulation method for determining the firing rate, capacity, or output to create with each stage, such as those of FIG. 13 or 17, is performed at a second interval shorter than the first interval. In one example, the staging method is performed every $n^{th}$ time that the modulation method is performed, with the modulation method performed at timed intervals.

In yet another embodiment, a stage modulation method, for example, the methods of FIGS. 13 and 17, may be used to provide data for performing a staging method. For example, a number of individual stages may be modulated in light of received sensor outputs indicating deviance from a setpoint or other factors. Then, the command signals sent to the individual stages may be monitored to determine whether the number of stages being operated should be modified.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A computer implemented method of operating a boiler system having a plurality of boiler stages which may be active or inactive at a given time, the boiler stages having outputs, the method comprising:
    performing a boiler staging sequence, at a first timed interval, to determine how many of the plurality of boiler stages should be active or inactive, the boiler staging sequence including:
        implementing a boiler addition control loop to make a first number of the plurality of boiler stages active based at least partially on a calculated error rate, and
        implementing a boiler removal control loop to make a second number of the plurality of boiler stages inactive based at least partially on the calculated error rate; and
    performing a boiler modulation sequence, at a second timed interval shorter than the first timed interval, the boiler modulation sequence including:
        using the determinations made during the boiler staging sequence as to how many of the plurality of boiler stages should be active and inactive;
        modulating a first boiler stage to operate at less than 100% of its output, and
        modulating a second boiler stage to operate at less than 100% of its output;
    wherein the first and second boiler stages are modulated while both boiler stages are active.

2. The computer implemented method of claim 1 wherein each of the plurality of boiler stages is an individual boiler, and wherein the step of performing a boiler staging sequence determines how many individual boilers should be active.

3. The computer implemented method of claim 1 further comprising the step of performing a selecting sequence to determine which of the boiler stages should be active.

4. The computer implemented method of claim 3 wherein the selecting sequence includes a first on/first off method.

5. The computer implemented method of claim 3 wherein the selecting sequence is adapted to equalize the time in which the boiler stages are active.

6. A controller for a boiler system, the controller performing the steps of claim 5.

7. A controller for a boiler system, the controller performing the steps of claim 1.

8. A computer implemented method as in claim 1 wherein the steps of modulating a first boiler stage to operate at less than 100% of its output and modulating a second boiler stage to operate at less than 100% of its output are such that both the first and second boiler stages operate at less than 100% of their respective outputs at the same time.

9. A computer implemented method of providing heat capacity in response to a heat load using a boiler system having a plurality of boiler stages that may be active or inactive at a given time, the method comprising:
    performing a boiler staging sequence, at a first timed interval, to determine which of the plurality of boiler stages should be active or inactive, the boiler staging sequence including:
        implementing a boiler addition control loop to make a first number of the plurality of boiler stages active based at least partially on a calculated error rate,
        implementing a boiler removal control loop to make a second number of the plurality of boiler stages inactive based at least partially on the calculated error rate, and
        activating the determined active boiler stages, if any; and
    performing a boiler modulation sequence, at a second timed interval shorter than the first timed interval, the boiler modulation sequence including:
        using the determinations made during the boiler staging sequence as to how many of the plurality of boiler stages should be active and inactive;
        and when the determined active boiler stages includes two or more of the plurality of boiler stages, modulating the active boiler stages, while they are active.

10. The computer implemented method of claim 9 wherein the step of modulating the active boiler stages includes modulating each active boiler stage to substantially the same level of modulation.

11. The computer implemented method of claim 9 wherein the step of modulating the active boiler stages includes sending a modulation signal to each of the active boiler stages from a single controller.

12. A controller for a multi-boiler system, the controller performing the steps of claim 9.

13. A computer implemented method of operating a boiler system having a plurality of boiler stages which may be active or inactive at a given time, the method comprising the steps of:
    performing, at a first timed interval, a boiler staging sequence to determine how many of the boiler stages should be active or inactive, the boiler staging sequence including:
        implementing a boiler addition control loop to make a first number of the plurality of boiler stages active based at least partially on a calculated error rate, and
        implementing a boiler removal control loop to make a second number of the plurality of boiler stages inactive based at least partially on the calculated error rate; and
    performing, at a second timed interval shorter than the first timed interval, a modulating boiler sequence to modulate the active boiler stages, the modulating boiler sequence including:
        setting values for use in the modulating boiler sequence, which includes the setting of the total heat command to the amount of heat demanded at that particular time, and
        using the determinations made during the boiler staging sequence as to how many of the plurality of boiler stages should be active and inactive.

14. The computer implemented method of claim 13 wherein the boiler staging sequence includes a sub-method for making an inactive boiler stage active and a sub-method for making an active boiler stage inactive, wherein:

the sub-method for making an inactive boiler stage active is disabled for a first time period after an inactive boiler stage is made active;

the sub-method for making an active boiler stage inactive is disabled for a second time period after an active boiler stage is made inactive; and the second time period is shorter than the first time period.

15. The computer implemented method of claim 13 wherein the boiler system includes a number of separate boilers, wherein each boiler represents a boiler stage.

16. A controller for a boiler system, the controller performing the steps of claim 13.

17. A computer implemented method of controlling a multi-stage boiler system having a number of boiler stages that can be either active or inactive, the method comprising the steps of:

calculating an error based upon a difference between a boiler system fluid return temperature and a setpoint;

determining whether to make an inactive boiler stage active based at least partially on the calculated error; and determining whether to make an active boiler stage inactive based at least partially on the calculated error; wherein:

a first time delay is provided after making an inactive boiler stage active and before a determination is made whether or not to activate any additional boiler stages, a second time delay is provided after making an active boiler stage inactive and before a determination is made whether or not to deactivate any additional boiler stages;

wherein the first time delay is longer than the second time delay; and wherein the first and second time delays are used to preserve stability in the multi-stage boiler system by limiting over-cycling due to excessively quick staging.

18. A computer implemented method of staging and modulating a boiler system in response to a load comprising the steps of:

staging and modulating the boiler system using a first control method that is adapted for achieving increased efficiency under a first set of boiler system conditions, which first set of conditions include a calculated system error being less than a predetermined quantity; and staging and modulating the boiler system using a second control method that is adapted to allow cycling of boiler stages under a second set of boiler system conditions, which second set of conditions include a boiler being taken offline for maintenance;

wherein at least one of the first control method and the second control method includes:

performing, at a first timed interval, a boiler staging sequence to determine how many of the boiler stages should be active; and performing, at a second timed interval shorter than the first timed interval, a modulating boiler sequence to modulate the active boiler stages.

19. The computer implemented method of claim 18 wherein at least one of the second set of conditions is that the load exceeds a threshold.

20. The computer implemented method of claim 18 wherein at least one of the second set of conditions is that the boiler system has operated by staging and modulating using the first control method for a predetermined time period.

21. The computer implemented method of claim 18 wherein the first set of conditions includes non-occurrence of all of the second set of conditions.

22. The computer implemented method of claim 18 wherein both of the first control method and the second control method includes:

performing, at a first timed interval, a boiler staging sequence to determine how many of the boiler stages should be active; and performing, at a second timed interval shorter than the first timed interval, a modulating boiler sequence to modulate the active boiler stages.

23. The computer implemented method of claim 18 wherein at least one of the first control method and the second control method includes a sub-method for making an active boiler stage inactive and a sub-method for making an inactive boiler stage inactive, wherein:

the sub-method for making an inactive boiler stage active is disabled for a first time period after an inactive boiler stage is made active;

the sub-method for making an active boiler stage inactive is disabled for a second time period after an active boiler stage is made inactive; and the second time period is shorter than the first time period.

24. A boiler system comprising:

a controller configured to perform the method of claim 18; and a switch;

wherein the first set of conditions includes having the switch in a first configuration, and the second set of conditions includes having the switch in a second configuration, the switch adapted to allow a user to manually select one of the first configuration or the second configuration.

25. A computer implemented method of performing a staging sequence for a multi-stage boiler system in which at least one boiler stage can be either active or inactive, the method comprising the steps of:

calculating an error based upon a difference between a boiler system fluid return temperature and a setpoint;

determining a rate of change of the error, the rate of change of the error being determined based upon a computed difference between a current measured value and an old measured value of the boiler system fluid return temperature;

and mathematically combining the error and the rate of change of the error to determine whether:

an inactive boiler stage should become active;

an active boiler stage should become inactive;

or, if it is determined that neither an inactive boiler stage should become active nor an active boiler stage should become inactive, determining that no change in the number of active stages is necessary.

26. A controller for a boiler system, the controller performing the method of claim 25.

* * * * *